United States Patent
Rickett et al.

(10) Patent No.: US 10,429,530 B2
(45) Date of Patent: Oct. 1, 2019

(54) DEGHOSTING WITH ADAPTIVE OPERATORS

(71) Applicant: WESTERNGECO L.L.C., Houston, TX (US)

(72) Inventors: James E. Rickett, Cambridge (GB); Dirk-Jan van Manen, Otelfingen (CH)

(73) Assignee: WESTERNGECO L.L.C., Houston, TX (US)

( * ) Notice: Subject to any disclaimer, the term of this patent is extended or adjusted under 35 U.S.C. 154(b) by 748 days.

(21) Appl. No.: 14/787,967

(22) PCT Filed: Apr. 29, 2014

(86) PCT No.: PCT/US2014/035827
§ 371 (c)(1),
(2) Date: Oct. 29, 2015

(87) PCT Pub. No.: WO2014/179282
PCT Pub. Date: Nov. 6, 2014

(65) Prior Publication Data
US 2016/0084977 A1 Mar. 24, 2016

Related U.S. Application Data

(60) Provisional application No. 61/817,151, filed on Apr. 29, 2013.

(51) Int. Cl.
*G01V 1/36* (2006.01)
*G01V 1/28* (2006.01)
*G01V 1/32* (2006.01)

(52) U.S. Cl.
CPC .............. *G01V 1/364* (2013.01); *G01V 1/282* (2013.01); *G01V 1/32* (2013.01); *G01V 2210/47* (2013.01); *G01V 2210/56* (2013.01)

(58) Field of Classification Search
CPC .......... G01V 1/282; G01V 1/364; G01V 1/32; G01V 2210/56; G01V 2210/47
(Continued)

(56) References Cited

U.S. PATENT DOCUMENTS 5,365,492 A 11/1994 Dragoset
6,021,092 A * 2/2000 Paffenholz ............ G01V 1/364
367/21

(Continued)

OTHER PUBLICATIONS

Andrew, et al., "Scalable training of L1-regularized log-linear models," in Proceedings of the 24th International Conference on Machine Learning, Corvallis, OR 2007, pp. 33-40, ACM.

(Continued)

*Primary Examiner* — Alexander Satanovsky
(74) *Attorney, Agent, or Firm* — Michael Guthrie

(57) ABSTRACT

Methods and apparatuses for processing marine seismic data with a process of combined deghosting and sparse τ-p transformation. The process is formulated as an optimization problem. The optimization problem has an objective function that is a weighted sum of two norms: one norm is an Lp norm of the differences between the modeled data and acquired survey wherein the modeled data are derived from a model and a set of adaptive filters; the other norm is an Lq norm of the model; and the optimization variables and solutions are the coefficients of the model and coefficients of the adaptive filters.

20 Claims, 16 Drawing Sheets

(58) Field of Classification Search
USPC ....... 702/14, 16, 17, 18, 32, 96, 191; 367/73
See application file for complete search history.

(56) References Cited

U.S. PATENT DOCUMENTS

| | | |
|---|---|---|
| 2008/0221801 A1 | 9/2008 | Craft et al. |
| 2011/0090760 A1 | 4/2011 | Rickett et al. |
| 2011/0141849 A1 | 6/2011 | Brittan |
| 2011/0255371 A1* | 10/2011 | Jing .................. G01V 1/28 367/73 |
| 2012/0243371 A1 | 9/2012 | Zhang et al. |
| 2012/0290214 A1 | 11/2012 | Huo et al. |
| 2013/0100771 A1 | 4/2013 | Diallo et al. |
| 2016/0139283 A1* | 5/2016 | Kamil .................. G01V 1/364 702/17 |

OTHER PUBLICATIONS

Asnaashari, et al., "Regularized seismic full waveform inversion with prior model information," Geophysics, Society of Exploration Geophysicists, US, vol. 78, No. 2, Mar. 1, 2013, pp. R25-R36.

Bunks, et al., "Multiscale seismic waveform inversion," Geophysics, vol. 60, No. 5, 1995, pp. 1457-1473.

Claerbout, "Earth Soundings Analysis: Processing versus Inversion," Blackwell Science, 1992.

Claerbout, "Geophysical Estimation by Example," published on Sep. 30, 2014 by Jon Claebout.

Crawley, et al., "Interpolation with smoothly nonstationary prediction-error filters," 69th Annual International Meeting, SEG, Expanded Abstracts, 1999.

Ferber, et al., "L1 pseudo-vz estimation and deghosting of single-component marine towed-streamer data," 74th EAGE Conference and Exhibition, Expanded Abstracts,: 2012.

Fomel, "Shaping regularization in geophysical-estimation problems, Geophysics, 72(2), R29-R36.," 2007.

Kragh et al., "Efficient broadband marine acquisition and processing for improved resolution and deep imaging," The Leading Edge, 29(4), 464-469. 2010.

Moldoveanu, et al., "Broadband seismic methods for towed-streamer acquisition," 74th EAGE Conference and Exhibition, Expanded Abstracts. 2012.

Moldoveanu, et al., "What is the next step after WAZ for exploration in the Gulf of Mexico?," 79th Annual International Meeting, SEG, Expanded Abstracts. 2009.

Nocedal, "Updating quasi-Newton matrices with limited storage," Mathematics of Computation, vol. 35, No. 151, Jul. 1980, pp. 773-782.

Ozbek et al., "New Marine Towed-Streamer Acquisition Technology," in Proceedings of the Offshore Technology Conference. May 6-9, 2013, pp. 1-11.

Rickett, et al., 2007. "4D time strain and the seismic signature of geomechanical compaction at Genesis," The Leading Edge, 2007, vol. 26, No. 5, pp. 644-647.

Robertsson et al., "Rough-sea deghosting using a single streamer and a pressure gradient approximation, Geophysics, 67(6), 2005-2011," 2002.

Tenghamn et al., "A dual-sensor, towed marine streamer; its viable implementation and initial results," 77th Annual International Meeting, SEG, Expanded Abstracts. 2007.

Wang et al., "Premigration deghosting for marine towed streamer data using a bootstrap approach," 82nd Annual International Meeting, SEG, Expanded Abstracts. 2012.

International Search Report and Written Opinion for the equivalent International patent application PCT/US2014/035827 dated Aug. 22, 2014.

International Preliminary Report on Patentability for the equivalent International patent application PCT/US2014/035827 dated Nov. 3, 2015.

Search Report for the equivalent European patent application 14791712.4 dated Nov. 14, 2016.

Communication pursuant to Article 94(3) for the equivalent European patent application 14791712.4 dated Nov. 28, 2016.

Examination Report for the equivalent Australian patent application 2014260145 dated Apr. 10, 2017.

* cited by examiner

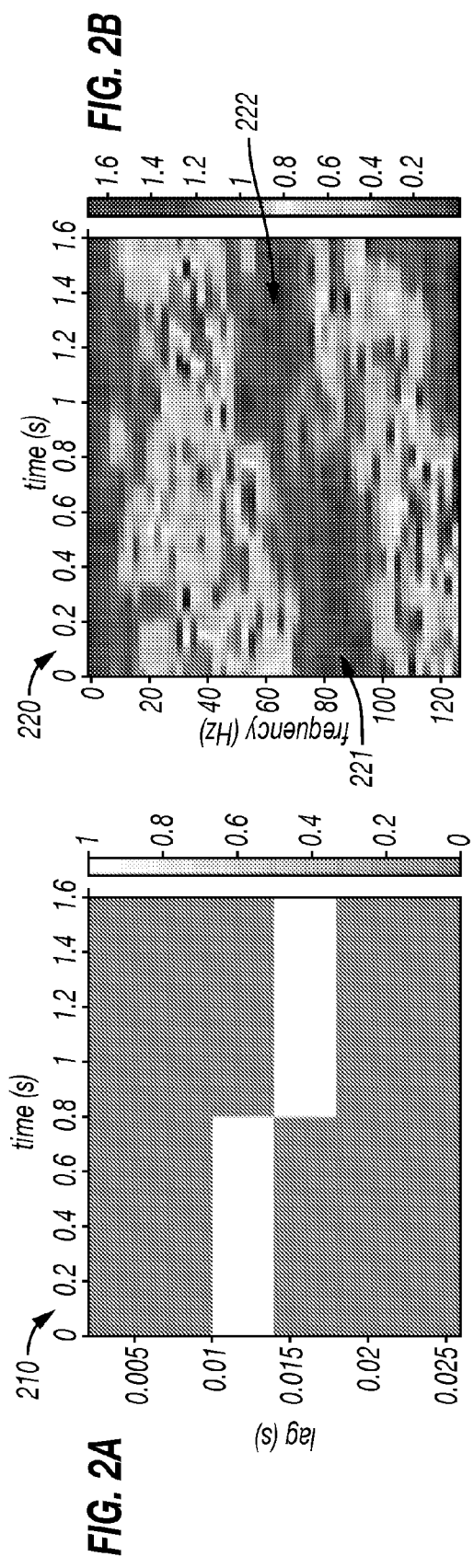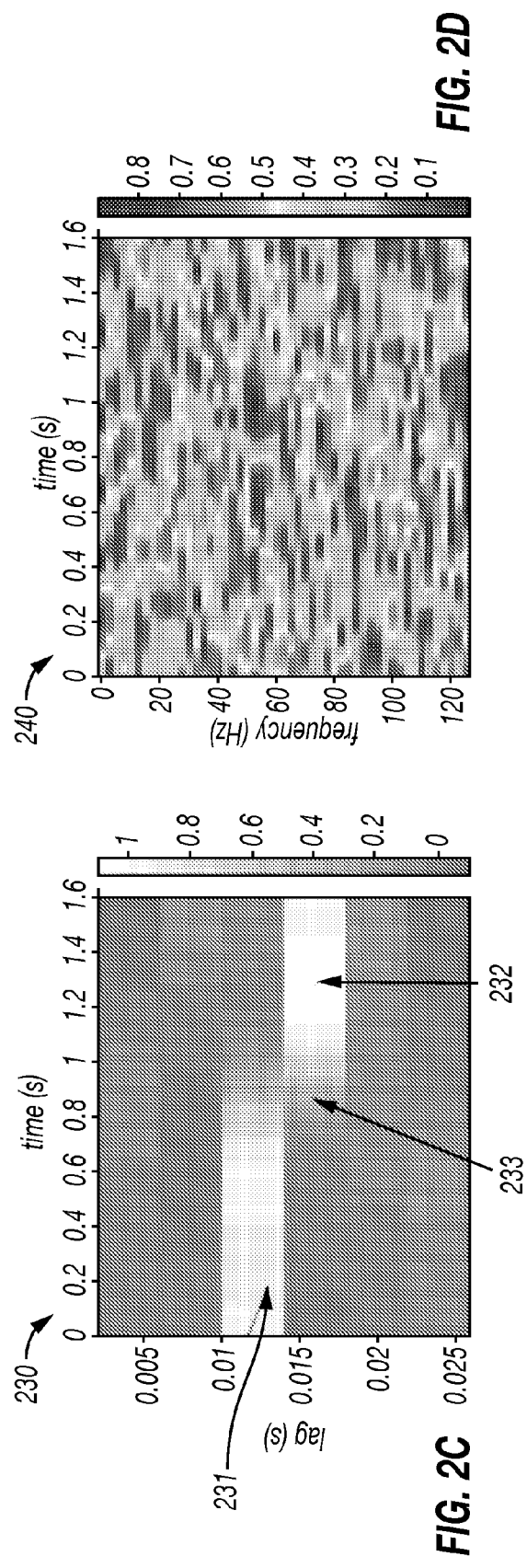
FIG. 2A  FIG. 2B  FIG. 2C  FIG. 2D

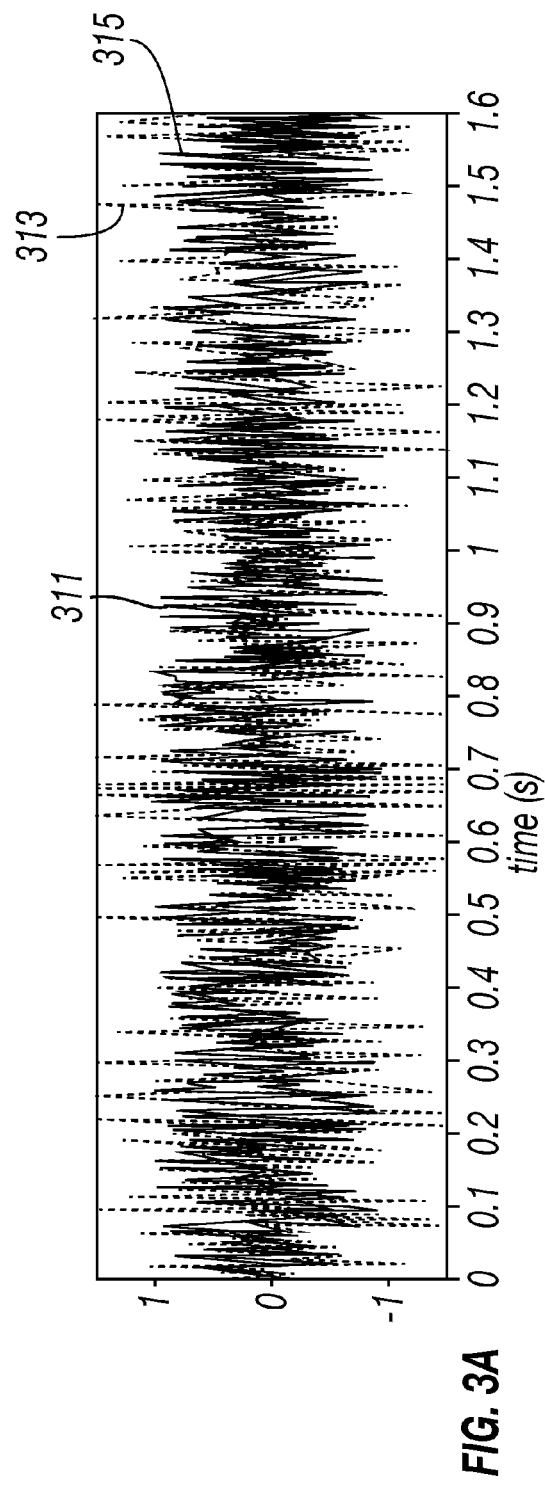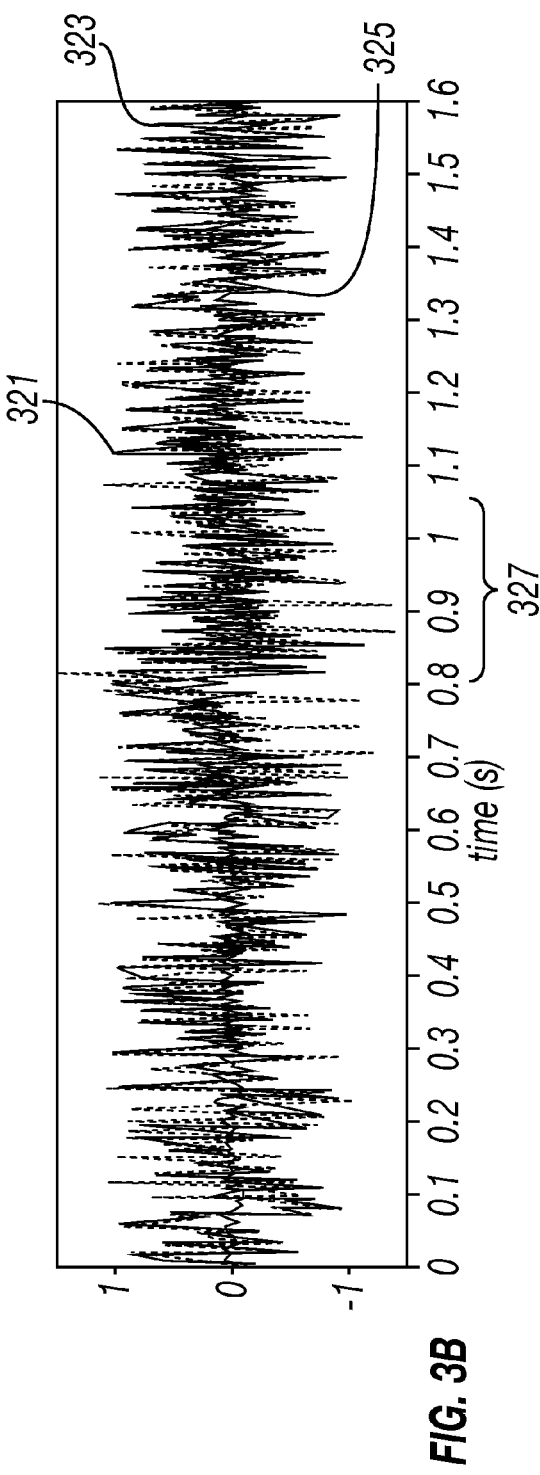
FIG. 3A
FIG. 3B

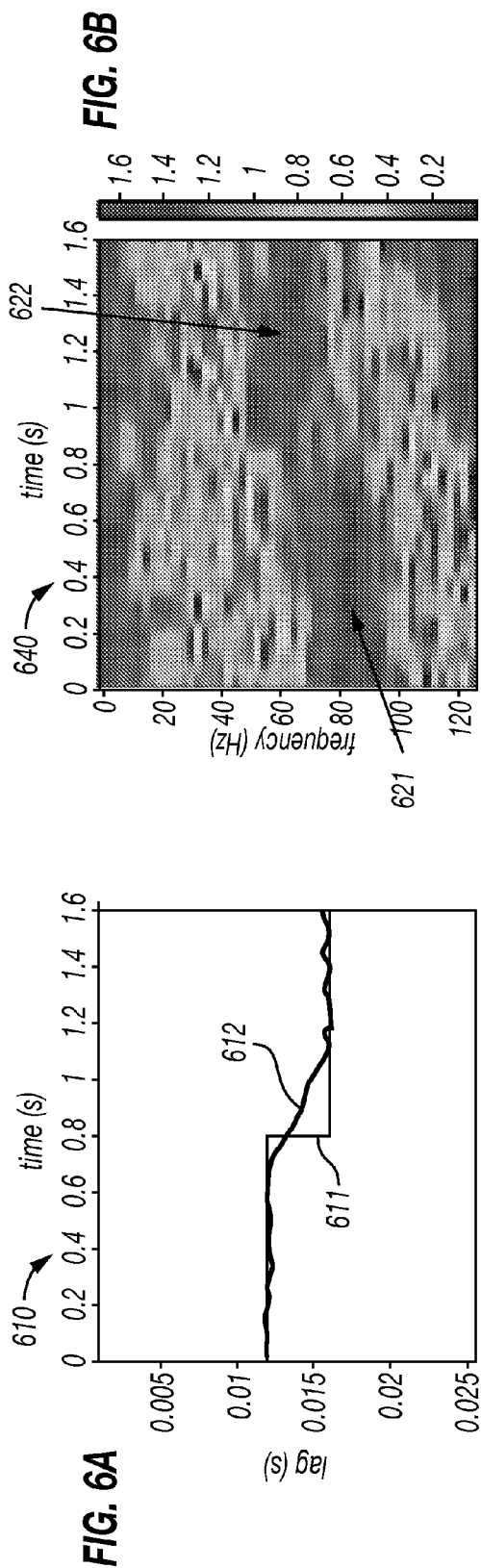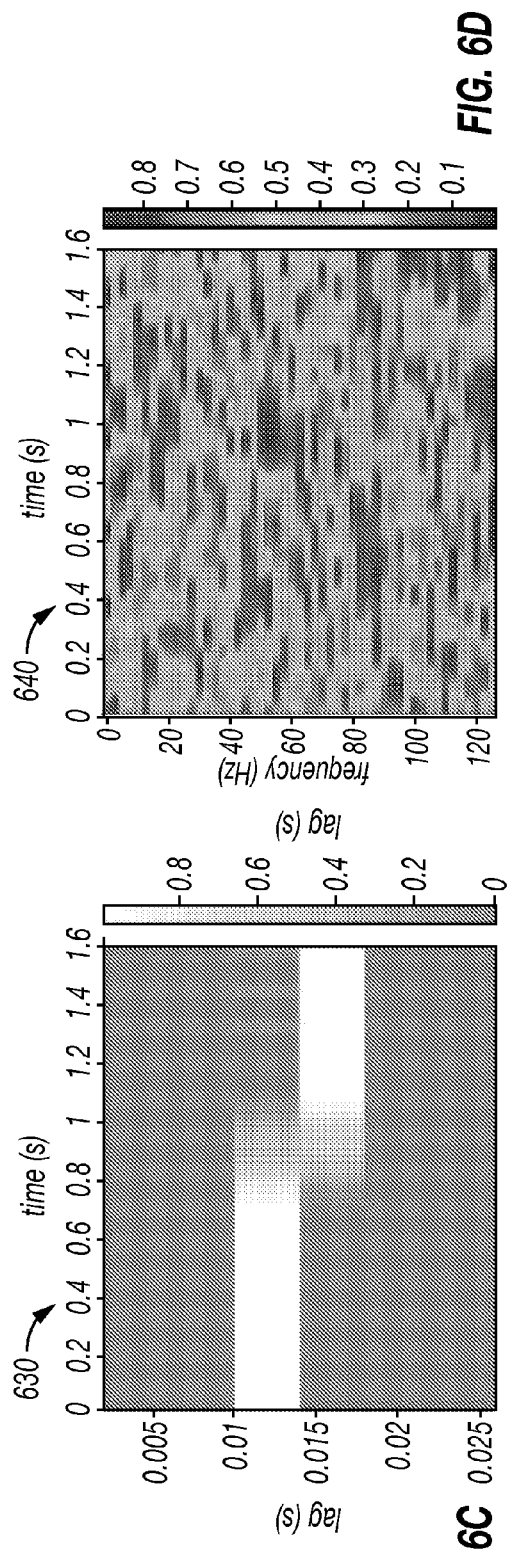

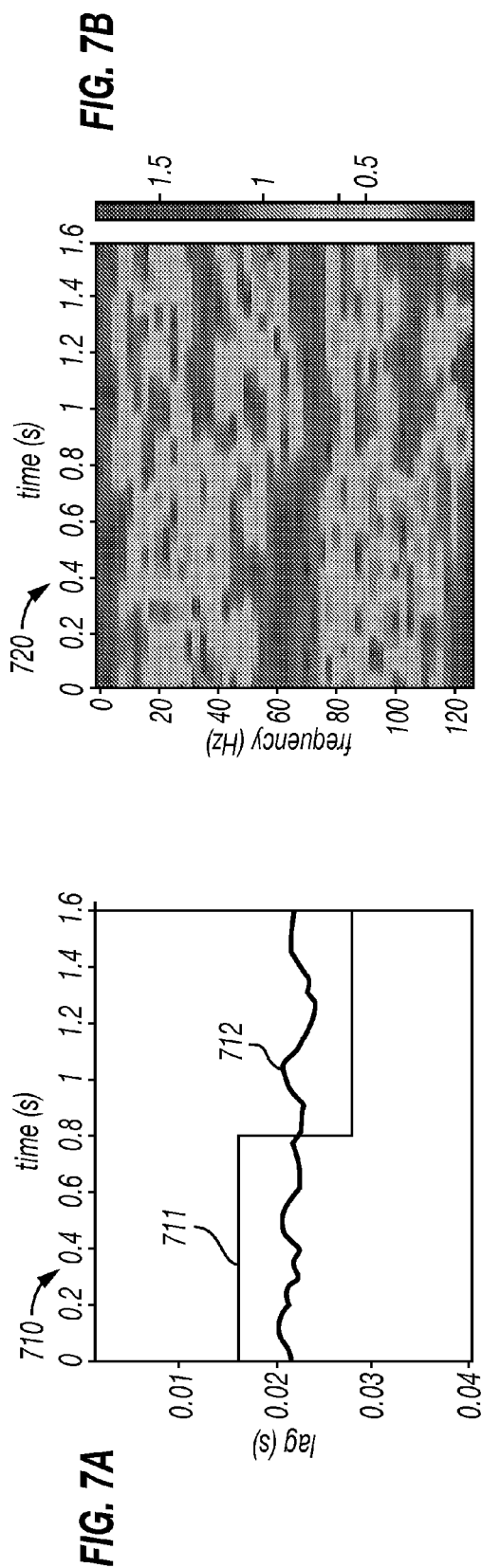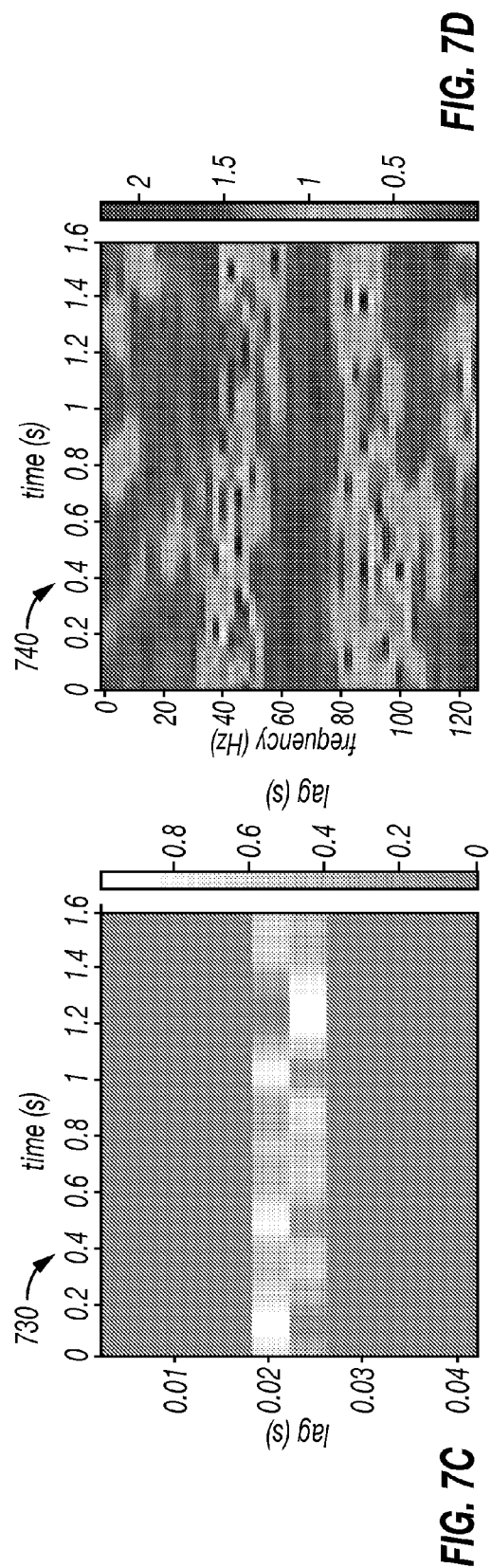
FIG. 7A  FIG. 7B  FIG. 7C  FIG. 7D

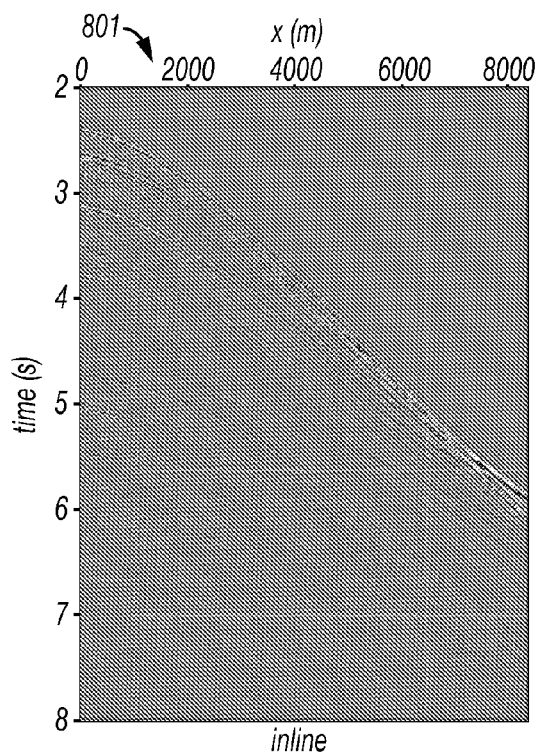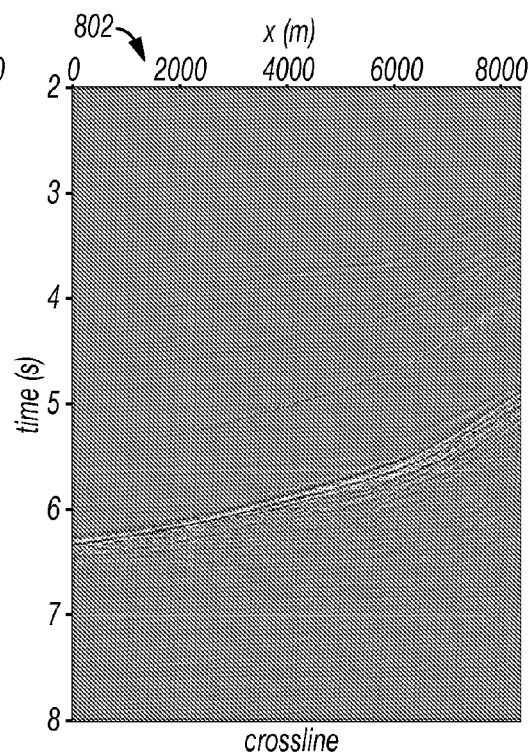
FIG. 8A  FIG. 8B
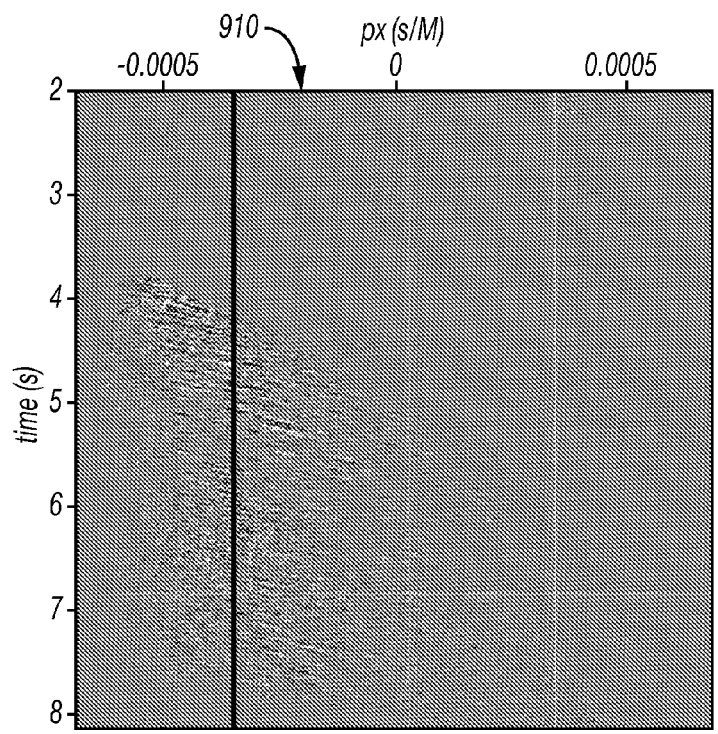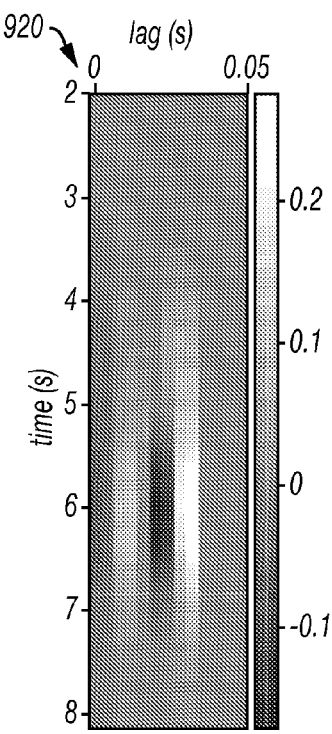
FIG. 9

DEGHOSTING WITH ADAPTIVE OPERATORS

CROSS-REFERENCE TO RELATED APPLICATIONS

This application claims the benefit of U.S. Provisional Application Ser. No. 61/817,151 filed on 29 Apr. 2013, with the same title, the disclosure of which is incorporated by reference herein in its entirety.

BACKGROUND

This disclosure relates to seismic exploration for oil and gas and, in particular but not by way of limitation, relates to seismic data processing using adaptive operators.

Seismic exploration involves surveying subterranean geological formations for hydrocarbon deposits. A survey may involve deploying seismic source(s) and seismic sensors at predetermined locations. The sources generate seismic waves, which propagate into the geological formations, creating pressure changes and vibrations along the way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), while others are sensitive to particle motion (e.g., geophones); industrial surveys may deploy one type of sensor or both types. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may not only be conducted in saltwater environments, but also in fresh and brackish waters. In one type of marine survey, called a "towed-array" survey, an array of seismic sensor-containing streamers and sources is towed behind a survey vessel. Other surveys are known as "land" surveys because they are conducted on land environments. Land surveys may use dynamite or seismic vibrators as sources. Arrays of seismic sensor-containing cables are laid on the ground to receive seismic signals. The seismic signals may be converted, digitized, stored or transmitted by sensors to data storage and/or processing facilities nearby, e.g. a recording truck. Land surveys may also use wireless receivers to avoid the limitations of cables. Seismic surveys may be conducted in areas between land and sea, which is referred to as the "transition zone". Other surveys, incorporating both hydrophones and geophones, may be conducted on the seabed.

One of the goals of the seismic survey is to build up an image of a survey area for purposes of identifying subterranean geological formations. Subsequent analysis of the representation may reveal probable locations of hydrocarbon deposits in subterranean geological formations. However, before a desired image can be built, the acquired seismic data need to be processed, e.g. cleaned and re-conditioned. The desired signals are the ones that travel from a source, are reflected by a subsurface structure once and are received by a receiver. They are referred to as direct reflection signals. The direct reflection signals are used to build up an image. All other undesired signals or noises need to be removed from the acquired seismic data. Some of the undesired signals that are reflected by subsurface structures multiple times before reaching a receiver are referred to as "multiples". Others that are reflected by air-water interface (ocean surface) at least once are referred to as "ghost" signals. Signals originating from sources other than the controlled seismic sources of the survey are noises. There are many different methods to process seismic data to obtain the desired seismic data.

Ghost signals from the sea surface cause constructive and destructive interferences in marine towed-streamer seismic data. A ghost signal that is reflected by the air-water interface first then by a subsurface geological layer may be referred to as a "source-side ghost." A ghost signal that is reflected by a subsurface geological layer first then by the air-water interface may be referred to as a "receiver-side ghost." Both the source-side and receiver-side ghosts need to be removed during marine seismic data processing. The process or method to remove ghost effects may be referred to as "de-ghost". There are many ways to remove ghost signals, or "de-ghost". For example, the ghost effects can be modelled and mitigated to some degree if the wavefield is well-sampled spatially and the receiver depths are known. Unfortunately if these conditions are not met, which is often the case, receiver-side deghosting, among other things, may be problematic.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure relates to a methods and an apparatus for deghosting seismic data using adaptive operators, especially in the event that the ghost model is uncertain. In an embodiment of the present invention, the ghost model and the upward-going wavefield are simultaneously estimated so that together the ghost model and the upward-going wavefield match the recorded data.

In some embodiments, a simple or in some aspects the simplest model possible is used to model the upward-going wavefield. Use of simple models may provide for generating adaptive operators based on the recorded data.

In one embodiment, the marine seismic survey data are collected; coefficients of an initial mode and coefficients of a set of adaptive filters are assumed/estimated; synthesized data based on the model and adaptive filters are derived; the differences between the synthesized data and the survey data are computed; then an optimization problem is set up and solved. The optimization problem includes an objective function that is a weighted sum of two norms, a first norm is an Lp norm of the differences; a second norm is an Lq norm of the model x; the variables and solutions are the coefficients of the model and the coefficients of filters; p and q are non-negative numbers. The solution of the optimization problem is used to derive any desired wavefield characterizations.

BRIEF DESCRIPTION OF DRAWINGS

Embodiments of this disclosure are described with reference to the following figures. The same numbers are used throughout the figures to reference like features and components. A better understanding of the methods or apparatuses can be had when the following detailed description of the several embodiments is considered in conjunction with the following drawings, in which:

FIG. 2 illustrates examples of a synthetic test of infinite impulse response (IIR) filtering. FIG. 2a shows a synthetic ghost model, 2b shows an input spectrogram of data showing ghost notches, 2c shows an estimated ghost model, and 2d shows a spectrogram of deghosted data.

FIG. 3 illustrates more examples of the synthetic test of IIR filtering of FIG. 2. FIG. 3a shows the signal before deghosting and 3b shows the signal after deghosting.

FIGS. 6a-6d illustrate an example synthetic test of IIR filtering with ghost delay parameterization: 6a true (red) and estimated (blue) ghost delays, 6b spectrogram of input data, 6c estimated ghost filters, and 6d spectrogram of deghosted data.

FIGS. 7a-7d illustrate an example of a more difficult synthetic test of IIR filtering with ghost delay parameterization: 7a true (red) and estimated (blue) ghost delays; 7b spectrogram of input data, 7c estimated ghost filters, and 7d spectrogram of deghosted data.

FIG. 8 illustrates an example of common shot gathers used for testing the data: 8a an inline gather, and 8b a crossline gather.

FIG. 9 illustrates a sparse τ-p model for spatial window located in the center of the inline gather, and an estimated finite impulse response (FIR) ghost model at the location of the blue line.

DETAILED DESCRIPTION

Figure 1:
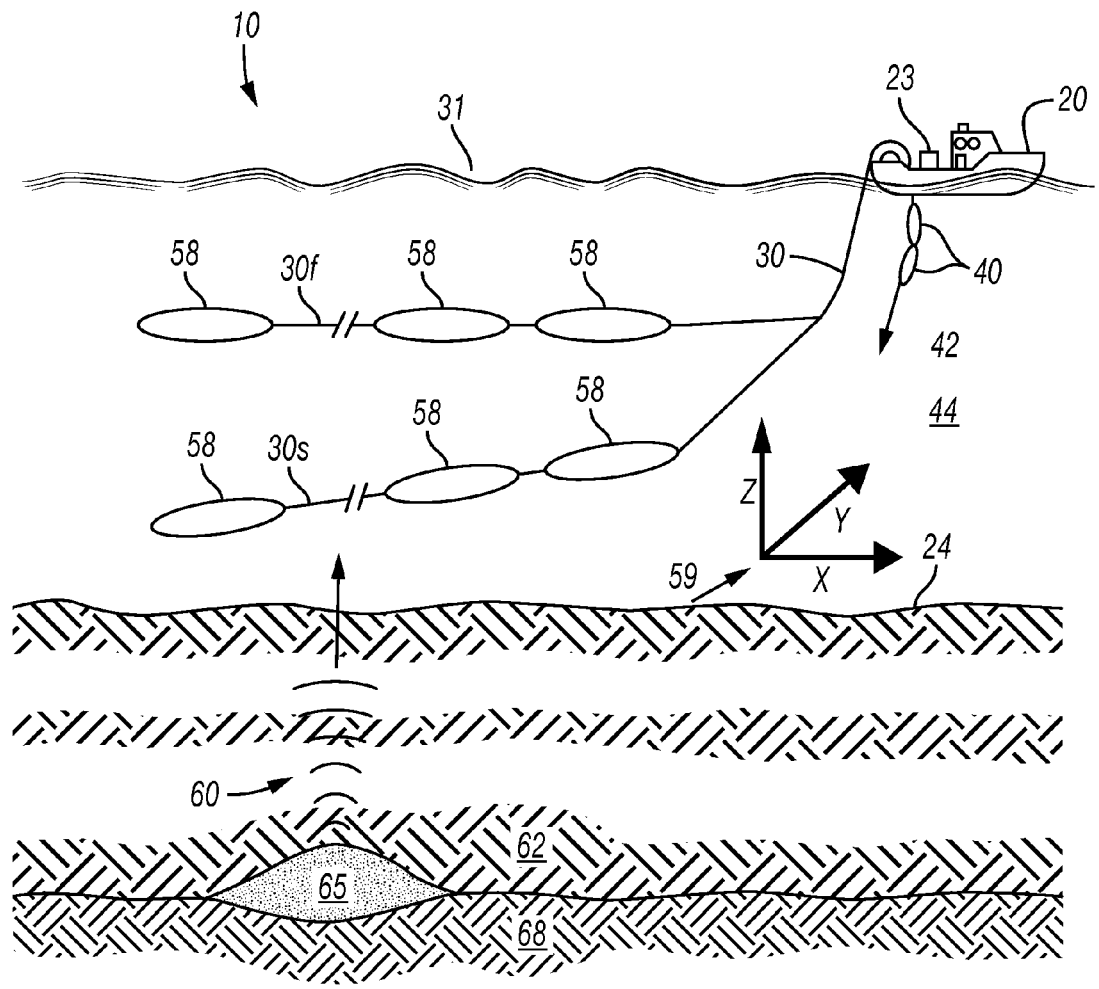
FIG. 1 illustrates a seismic acquisition system in a marine environment.

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well-known methods, procedures, components, and systems have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

Information, arguments, parameters, data, etc. may be passed, forwarded, or transmitted via any suitable means including memory sharing, message passing, token passing, network transmission, etc.

FIG. 1 depicts an embodiment 10 of a marine-based seismic data acquisition system. In the system 10, a survey vessel 20 tows one or more seismic streamers 30 (one streamer 30 being depicted in FIG. 1) behind the vessel 20. It is noted that the streamers 30 may be arranged in a spread in which multiple streamers 30 are towed in approximately the same plane at the same depth, for example, a flat streamer 30f as shown in FIG. 1. As another non-limiting example, a streamer may be towed in a slant plane such that the sensor depth is varied depending on its inline offset, such as a slant streamer 30s shown in FIG. 1. In another example, multiple streamers may be towed at multiple depths, such as in an over/under spread (not shown in FIG. 1), in which an over-streamer is on top of an under-streamer and the two streamers are the same except deployed at the different depths.

The seismic streamers 30 may be several thousand meters long and may contain various support cables (not shown), as well as wiring and/or circuitry (not shown) that may be used to support communication along the streamers 30. In general, each streamer 30 includes a primary cable into which are mounted seismic sensors that record seismic signals. The streamers 30 contain seismic sensors 58, which may be hydrophones to acquire pressure data or multi-component sensors. For example, sensors 58 may be multi-component sensors, each sensor may be capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

The multi-component seismic sensor may include one or more hydrophones, geophones, particle displacement sensors, particle velocity sensors, accelerometers, pressure gradient sensors, or combinations thereof.

The marine seismic data acquisition system 10 includes one or more seismic sources 40 (two seismic sources 40 being depicted in FIG. 1), such as air guns and the like. The seismic sources 40 may be coupled to, or towed by, the survey vessel 20. The seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as a formation 65 that is depicted in FIG. 1.

The incident acoustic signals 42 that are generated by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection from the air-water boundary 31, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. It is noted that while the physical wavefield is continuous in space and time, traces are recorded at discrete points in space which may result in spatial aliasing. The traces are recorded and may be at least partially processed by a signal processing unit 23 that is deployed on the survey vessel 20, in accordance with some embodiments. For example, a particular seismic sensor 58 may provide a trace, which corresponds to a measure of a pressure wavefield by its hydrophone; and the sensor 58 may provide (depending the sensor configurations) one or more traces that correspond to one or more components of particle motion.

The acquired seismic data are processed to build up an image of a survey area for purposes of identifying subterranean geological formations, such as the geological formation 65. Subsequent analysis of the representation may reveal probable locations of hydrocarbon deposits in subterranean geological formations. Depending on the particular survey design, portions of the analysis of the representation may be performed on the seismic survey vessel 20, by, for example, the signal processing unit 23. In other surveys, the representation may be processed by a seismic data processing system (such as a seismic data processing system in FIG. 11 and is further described below) that may be, for example, located on land or on the vessel 20.

As mentioned earlier, the acquired seismic data need to be processed or reconditioned before they can be used to build up an image. If the data are acquired by special methods, e.g. simultaneous source acquisition, the data need to go through a special process corresponding to the special acquisition method. For data acquired by simultaneous sources, the recorded composite data need to be separated into different data sets, each corresponding to its own source.

In this disclosure data-adaptive methods are described for deghosting seismic data in the event that the ghost model is uncertain. In some embodiments, the ghost model may be parameterized either in terms of a non-stationary finite impulse response (FIR) filter, or directly in terms of the ghost delay. The ghost model can then be estimated simultaneously with a sparse plane-wave decomposition. In some embodiments, the ghost delay parameterization allows the ghost model to adapt effectively, while constraining the form of the ghost operator.

If a seismic receiver is situated below the free-surface of the earth, the receiver records both signals traveling from depth, and their ghost reflections from the free surface. These ghost reflections cause a loss in frequency content through destructive interference, and produce artifacts in seismic images. Therefore, it is useful to attenuate their effects.

If the free-surface is flat, the receiver is close to the free surface, and the local velocity is homogeneous, then the ghost effect can be modeled as a temporal convolution in the ray-parameter domain:

$$d_{total} = d_{up} + d_{down} \quad (1)$$
$$= [\delta(0) - \delta(\Delta t)] * d_{up},$$

with $$\Delta t = 2z\sqrt{\frac{1}{v^2} - p_x^2 - p_y^2} \quad (1b)$$

where z is the depth of the receiver, v is the local wave velocity, and $p_x$ and $p_y$ are the inline and crossline components of wavenumber, respectively.

$$\Delta t \leq 2z\sqrt{\frac{1}{v^2} - p_x^2} \quad (15)$$

Equation 15, derived from Equation 1b can be used to constrain $\Delta t$ when the streamer depth is known and the inline direction is well sampled.

If the data is sufficiently well sampled at the surface, spatial Fourier transforms can be used/processed, horizontal ray parameters obtained, and the ghost operator can be explicitly calculated. Traditional "deterministic" deghosting algorithms treat the ghost operator as known, and process seismic data by invert its effects. Often, however, the seismic data is poorly sampled, especially in the cross-line direction, and, as a result $p_y$ is ambiguous. In this case, it may be possible to constrain the maximum value of $\Delta t$ in order to determine the ghost effect, but a deterministic approach cannot be used without making assumptions about $p_y$. For example, it is often assumed that waves propagate in a vertical plane between a source and a receiver in the seismic survey. However, this assumption is not true in practice as the earth has heterogeneity in three dimensions.

Furthermore, even if the wavefield is very well sampled in three dimensions ("3D"), rough seas, uncertainty in receiver depth and/or the like also invalidate deterministic ghost models based on Equation 1. In multi-component marine acquisition systems, information from complementary seismic measurements may be used to restore a missing or ambiguous signal, such as the cross-line signal/data. However, in single component systems such a signal can only be estimated.

In some embodiments, the deghosting process is adapted to account for/handle uncertainty in the ghost delay. The mechanism for doing so involves modelling the ghost operator, $[\delta(0)-\delta(\Delta t)]*$, using a short adaptive finite-impulse response ("FIR") filter in the τ-p domain. This model can either be parameterized in terms of filter coefficients themselves, or in terms of the ghost delay time. Parameterizing in terms of ghost delay time introduces additional nonlinearity to the problem, but constrains the parameter space considerably leading to more robust solutions. In an adaptive approach, both the ghost model and upgoing wavefield may be estimated by inversion.

The methods of the present invention may be used in the τ-x domain, rather than the f-x domain. Among other things, the p domain may be preferable to the x domain, since events are better separated, and the p parameterization ties more easily to the ray-based ghost model in of Equation 1. Working in time rather than frequency may also be advantageous, as it allows for more adaptivity.

The methods of the present invention may use predictive infinite impulse response (IIR) filtering, or combined adaptive deghosting with sparse plane-wave decomposition.

The causal convolution of a filter, f, of length $N_f$, with a time series, x of length, $N_x$, can be defined to give a second time series, y, of the same length, by the summation:

$$y_i = \begin{cases} \sum_{j=1}^{N_f} f_j x_{i-j} & \text{for } i > N_f, \\ 0 & \text{otherwise.} \end{cases} \quad (2)$$

Ignoring end effects, this can be generalized to the non-stationary case by including a bank of filter coefficients:

$$y_i = \sum_{j=1}^{N_f} f_{j,i-j} x_{i-j}, \quad (3)$$

Under this definition, an impulse as input picks out a single filter from the filter-bank: i.e. if $x_i=\delta_{ik}$, then $y_{i+k}=f_{i,k}$.

Equation 3 can be written in matrix-vector form as:

$$y = C_f x,$$

where x is a vector containing x, and $C_f$ is an $N_x \times N_x$ matrix that convolves its input with f. Elements of $C_f$ are given by:

$$(C_f)_{ij} = \begin{cases} f_{i-j,j} & \text{for } i > N_f \text{ and } i - N_f \leq j \leq i-1 \\ 0 & \text{otherwise.} \end{cases}$$

Alternatively, the elements of the filter-bank may be stored as a vector so that $f_{i+N(j-1)}=f_{i,j}$, and then Equation 3 may be rewritten as a linear operation on f as follows:

$$y = \hat{C}_x f,$$

where X is an $N_x \times N_x N_f$ matrix with elements given by:

$$(\hat{C}_f)_{ij} = x_{i-k}\delta_{i-k-l}, \quad (4)$$

where $$k = j - N_f \left\lfloor \frac{j-1}{N_f} \right\rfloor$$

and $$l = 1 + \left\lfloor \frac{j-1}{N_f} \right\rfloor,$$

and the notation $\lfloor \rfloor$ refers to the "floor" operator that rounds down.

These linear relationships provide tools that able estimation of the filter coefficients in conjunction with deghosted signals using descent-based solvers. In a function that takes as input both a time series and non-stationary filter bank, $$a(f,x) = C_f x = \hat{C}_x f,$$

then the linearization of this transformation is given by:

$$\delta a = C_f \delta x + \hat{C}_x \delta f.$$

The Jacobians of a with respect to filter coefficients and input time-series are $\hat{C}_x$ and $C_f$ respectively.

In this application, the ghosting operator is expressed in the form $(I-C_f)$. Here the fixed first term, I, models the primary (up-going) arrival, and the adaptive second term, $C_f$, models the ghost (down-going) arrival.

Predictive IIR Filtering

Predictive deconvolution has long been used for short period multiple removal. In this approach, a finite-impulse response (FIR) filter is used to approximate the inverse of the (IIR) multiple generating operator, and the output of an operator on the data is minimized with respect to the operator coefficients. For stationary FIR filtering this has several very useful properties. Firstly, the resulting FIR filter is guaranteed to be minimum phase, meaning it represents a physically realizable multiple generator. Secondly, the predictive filter whitens the spectrum of the input data, meaning it is spectrally unbiased.

Unfortunately, however, FIR filters are not suitable for representing the inverse of a ghost operator, because ghost operators have finite impulse response, and consequently their inverses are infinite. As such, in accordance with an embodiment of the present invention, it has been found to be more appropriate to represent the ghost operator itself as an FIR filter, so that its inverse is then an IIR filter.

Algorithmically, the data can be transformed to the τ-p domain, and then the energy of the deghosted data can be minimized, such that:

$$b(f) = (I - C_f)^{-1} d_{rp}, \quad (5)$$

with an objective function of the form:

$$\chi 1(f) = \frac{1}{2}|(I - C_f)^{-1} d_{rp}|^2 + c(f), \quad (6)$$

where $d_{rp}$ is the data in the τ-p domain, and c(f) is an optional constraint term to stabilize the system.

In embodiments of the present invention, the nonlinear least-squares objective function of Equation 6 may be minimized using the descent-based solver, L-BFGS. (See for example in Nocedal, J., 1980. UPDATING QUASI-NEWTON MATRICES WITH LIMITED STORAGE, *Mathematics of Computation*, 35(151), 773-782.) This is a fast, quasi-Newton solver that is suitable for solving large-scale systems. It avoids explicit storage of the Hessian matrix, and has consequently low-memory requirements. Although evaluating the function b(f) involves a matrix-inverse/vector product, the matrix is banded and the operation can be done efficiently by back-substitution.

The gradient of the objective function requires the Jacobian of the deghosting operator with respect to filter coefficients. This can be computed using the matrix identity, $\delta A^{-1} = -A^{-1} \delta A A^{-1}$:

$$\delta b = \delta[(I - C_f)^{-1}] d$$
$$= -(I - C_f)^{-1} \delta C_f (I - C_f)^{-1} d$$
$$= -(I - C_f)^{-1} \delta C_f b$$
$$= -(I - C_f)^{-1} \hat{C}_b \delta f,$$
$$= J_b \delta f.$$

Ignoring the constraint term, the gradient of the objective function in equation 6 is given by:

$$\nabla_{\chi 1} = J_b^T b \quad (7)$$
$$= -\hat{C}_b^T (I - C_f^T)^{-1} (I - C_f)^{-1} d_{r\mu}.$$

Again, in embodiments of the present invention, the inverse-matrix products can be computed on-the-fly, in essentially real-time, by back-substitution, and the projection back onto an update for non-stationary filter coefficients with $\hat{C}_b$ is defined above. In embodiments of the present invention, once the optimization problem is solved for filter coefficients, the data can be deghosted using equation 5, and the data (or the ghost model) can be transformed back to the t-x domain.

To test the methods described herein, a synthetic dataset was created out of white independent, identically-distributed (IID) Gaussian noise. This is shown as the blue curve (311, 321) in FIGS. 3a and 3b. A time-varying ghost model 210 with Δt=0.012 for t<0.8 s and Δt=0.016 for t≥0.8 s (shown in FIG. 2a) was applied to this data (blue curve) 311 to give the red curve 313 and their difference (green curve) 315 in FIG. 2a. Ghost notches (221 and 222) are visible in the spectrogram 220 (see FIG. 1b) at 62.5 Hz and 83.3 Hz in the two sections, respectively.

The estimated filters 230 are shown in FIG. 1c. The two different ghost delays 231 and 232 are well reconstructed with a smooth transition zone 233 between them. The estimated deghosted signal 323 and its error 325 are shown as the red and green curves, respectively, in FIG. 3b. The errors are generally small (<10% amplitude), except in the transition region 327 where they are higher. In the spectrogram of the estimated signal 240 (FIG. 2d) the imprint of the ghost notches is eliminated.

In embodiments of the present invention, to reduce the degrees of freedom for the model space, the ghost operator may be parameterized purely in terms of the ghost delay time, Δt from Equation 1. This also ensures that the ghost operator has the appropriate form of a shifted delta function.

This parameterization can be realized by defining an operator that maps non-stationary ghost delays to filter coefficients. For non-stationary filter coefficients parameterized by lag (t'), and time (t), h may be defined such that:

$$f(t', t) = h[\Delta t(t)] \quad (8)$$
$$= \alpha \delta[t' - \Delta t(t), t].$$

The parameter, α, determines how much of the ghost energy is to be removed, which may be varied. Setting α=1 would aggressively try to remove all ghost energy from a perfectly reflecting sea surface; however, in practice a is set such that α<1 in order to damp the deghosting process. In embodiments of the present invention, the choice of a may be optimized as part of the inversion.

Figure 4:
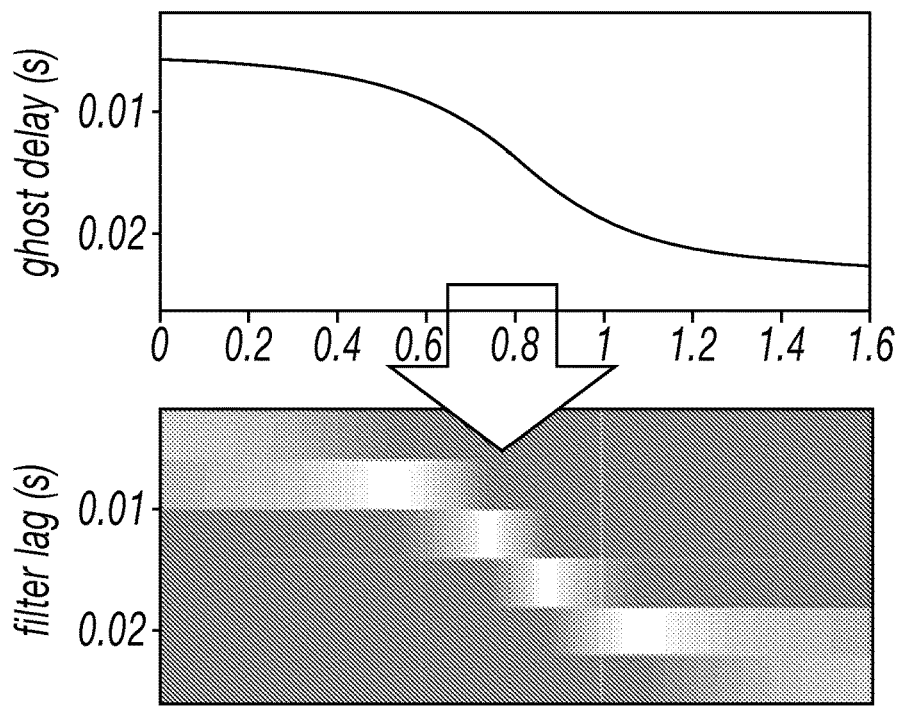
FIG. 4 illustrates an example mapping between $\Delta t(t)$ and $f(t',t)$.

For the examples in this application, the function, h is implemented by the adjoint of linear interpolation that "pushes" amplitude onto the two filter coefficients that bracket the value of Δt. This is illustrated in FIG. 4. Basing the operation on the adjoint of a higher-order interpolator would increase the fidelity of the algorithm, particularly at higher frequencies.

In practice, it may be useful to place hard constraints on Δt(t, $p_x$): where a minimum value ensures causality, and a maximum value is given by constraints. One way to achieve this is by making a change of variables. For the examples in this application, the change of variables may be given by:

$$\Delta t = r(\tilde{\Delta t}) \quad (9)$$
$$= c \tan^{-1}\left(\frac{\tilde{\Delta t}}{c}\right) + \Delta t_1,$$

Figure 5:
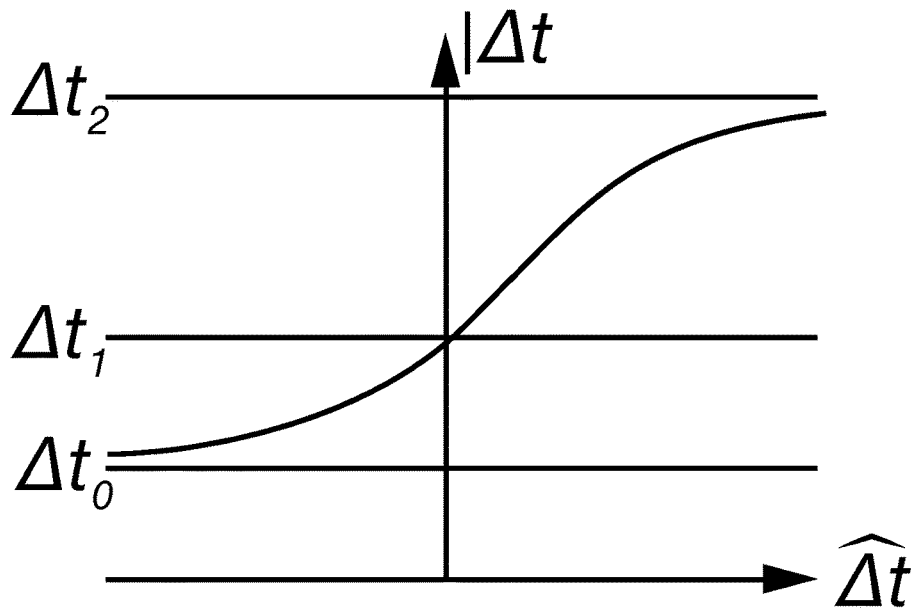
FIG. 5 illustrates an example range restriction operator, r, maps $\widehat{\Delta t}$ to the interval between $\Delta t_0$ and $\Delta t_2$.

-continued with $$c = \begin{cases} \frac{2}{x}(\Delta t_2 - \Delta t_1) & \text{for } \widetilde{\Delta t} > 0, \text{ and} \\ \frac{2}{\pi}(\Delta t_1 - \Delta t_0) & \text{otherwise.} \end{cases}$$

where: $\Delta t_0$ is the minimum allowable value for $\Delta t$, $\Delta t_2$ is the maximum allowable value, and $\Delta t_1$ is the most likely value. The functional form of r is shown in FIG. 5; it restricts $\Delta t$ to the appropriate range, and has a continuous first derivative equal to one at $\Delta t_1$.

With these two functions, in embodiments of the present invention, a new objective function may be defined as follows:

$$\chi 2(\widetilde{\Delta t}) = \frac{1}{2}|[I - C_{g(\widetilde{\Delta t})}]^{-1} d_{rp}|^2, \qquad (10)$$

where $$g(\widetilde{\Delta t}) = h[r(\widetilde{\Delta t})], \qquad (11)$$

and Z is a linear smoothing operator that is used as an alternative to explicit constraints on the smoothness of $\widetilde{\Delta t}$.

FIG. 6 shows the results of testing this parameterization on the same example as FIG. 2. As with the FIR parameterization, the inversion successfully adapts to the non-stationary nature of the ghost operator, and whitens the spectrogram of the output. FIG. 6a shows the true ghost delays 611 (red) and the estimated ghost delays 612 (blue); FIG. 6b shows the spectrogram of input data, where the ghost notches 621 and 622 are visible; FIG. 6c shows the estimated ghost filters 631; and FIG. 6d shows the spectrogram of deghosted data 640, where ghost notches are removed.

However, in the case of the more difficult ghost model shown in FIG. 7, the algorithm fails to converge on the correct model. This is because additional nonlinearity in the function, h, that maps ghost-delay times to filter coefficients causes the objective function, $\chi 2$, to become multi-modal, and the optimization becomes stuck in a local minimum. Essentially, the algorithm is picking the maximum of filter coefficients, which is a process prone to cycle-skipping problems. In field data tests examples discussed below, a multi-scale continuation strategy is used that reduces the problems associated with cycle-skipping in full-waveform inversion.

FIG. 7a shows the true (red) ghost delays 711 and estimated ghost delays 712; FIG. 7b shows a spectrogram of input data 720; FIG. 7c shows estimated ghost filters 730; and FIG. 7d shows the spectrogram of deghosted data 740.

Combined Deghosting and Sparse τ-p Transform

In accordance with an embodiment of the present invention, an alternative to the predictive filtering algorithm outlined above is a one-step algorithm that simultaneously deghosts while performing a sparse τ-p transform.

The high-resolution τ-p transform can be implemented as a basis pursuit denoise (BPDN) problem, minimizing an L1 norm of basis coefficients of a model x plus the L2 norm of the errors of the reconstructed data:

$$\chi 3(x) = \frac{1}{2}|Sx - d_{tx}|^2 + \lambda |x|, \qquad (12)$$

where x is the model in the τ-p domain, $d_{tx}$ is the marine seismic survey data in the t-x domain, and S is the local plane-wave synthesis operator that maps from the τ-p domain to the t-x domain. The main part of the first term of Equation 12, i.e. $(Sx - d_{tx})$, is the difference (or error) between the synthesized data from the model x and the acquired survey data. An appropriate weight $\lambda$ may be chosen to balance the two terms. The weight $\lambda$ is fixed for the optimization problem, but it is possible to change it during different iterations of the different optimization problems.

It is noted that the objective function is a sum of an Lp-norm of the difference and an Lq-norm of the basis model x itself. p and q are two non-negative numbers. The norms may be weighted norms. One unique feature of this objective function is that it is the sum of two norms that are related but different. The sum can be weighted, which is indicated by the balancing weight $\lambda$. The two norms are of different levels; one is L2 norm and one is L1 norm as shown in Equation 12. In the examples shown in this application, p is 2 and q is 1, but this selection is for illustrative purposes only. In some test examples, it is found that p can be 2, 1.5, 1 or 0, and q can be 2, 1.2, 1 or 0. Those objective functions can work equally well. The two norms can be many other combinations, and the two norms can be the same or different. In this optimization problem, the variables are the basis function coefficients of model x.

The optimization problem in Equation 12 can be modified to allow for adaptive filters. If they are parameterized by filter coefficients, the objective function becomes:

$$\chi 4(f,x) = \frac{1}{2}|S[I - C_f]x - d_{tx}|^2 + \lambda |x|, \qquad (13)$$

so that the basis coefficients have a ghost model $[I - C_f]$ applied prior to plane-wave synthesis. The adaptive filters or ghost operator $[I - C_f]$ in τ-p domain was discussed earlier. $[I - C_f]x$ are data including ghost in the τ-p domain. $S[I - C_f]x$ are synthesized data including ghost wavefields in the t-x domain. In this optimization problem, the variables are the basis function coefficients of model x and the coefficients of the filter $C_f$. The filter coefficients may have too many degrees of freedom, and some constraints may be necessary to confine them into a more manageable size. The constraints can make the optimization system more stable.

Similarly, as discussed earlier in reference to Equation 10, with the parameterization in terms of ghost delay, the objective function becomes:

$$\chi 5(\widetilde{\Delta t}) = \frac{1}{2}|S[I - C_{g(\widetilde{\Delta t})}]x - d_{tx}|^2 + \lambda |x| \qquad (14)$$

where g is defined by Equation 11. For the optimization problem with this objective function, the variables are reduced to the basis function coefficients of model x and the adaptive ghost delay times, which vary depending on the plane waves.

In contrast to the usual BPDN problem, the synthesis operations in objective functions 13 and 14 are both nonlinear; thus a nonlinear solver is better. Examples below have been solved by orthant-wise limited-memory quasi-Newton (OWL-QN) algorithm developed by Andrew, G. & Gao, J., 2007. Scalable training of L1-regularized log-linear models, in *Proceedings of the 24th International Conference on Machine Learning*, pp. 33-40, ACM, which is incorporated herein by reference. This algorithm is a variant of L-BFGS for solving objective functions with an L1 penalty on the model norm, i.e. of the form $$\chi + f(x) + |x|.$$

One distinction between objective functions 13 and 14, compared to 6 and 10, is that the former are functions of both basis coefficients, x, as well as filter parameters, while the latter are just functions of filter parameters. Simultaneously inverting for both sets of parameters leads to a more expensive algorithm, but it turns a two-step process into a globally optimal one-step process and has the potential to lead to a better solution. If the cost of this algorithm becomes an issue, potentially less expensive alternative methods may be used.

In some alternatives to objective functions 13 and 14 in t-x domain, the objective functions are made in τ-p domain:

$$\chi(x) = |[I - C_f]x - d_{rp}|^2 + \lambda |x| \quad (16)$$

and $$\chi(\widehat{\Delta t}) = |[I - C_{g\{\widehat{\Delta t}\}}]x - d_{rp}|^2 + \lambda |x| \quad (17)$$

These alternatives in Equations 16 and 17 are equivalent to Equations 13 and 14, but these would have a cost advantage in that the iterations would not have to include the relatively expensive plane-wave synthesis operator S. However, since the algorithm does not refer back to the original t-x data, it may provide a lower quality reconstruction.

In embodiments of the present invention, it is also possible to avoid the FIR filter altogether, and pose the problem directly in terms of adaptive time shifts. Such an approach may result in a slightly more efficient algorithm than the one presented above, but the cost savings may be small as the major cost comes from the Radon transform. In this alternative, the objective function can be defined as:

$$\chi = \frac{1}{2}|S[I - \alpha P(\Delta t)]x|^2 + \lambda |x| \quad (18)$$

where $P(\Delta t)$ is a linear non-stationary delay operator that has non-linear dependence on the ghost delay time.

The algorithms defined by objective functions 13 and 14 both require a two-dimensional τ-p transform to decompose the data into the inline ray parameter $p_x$ components. For variable-depth streamers, this may potentially be problematic. However, rather than decomposing the data into plane waves along the entire cable, local plane-waves may be used, and the assumption made that the receiver depth is locally constant. In embodiments of the present invention, the statistical nature of the algorithms compensates for the fact that this is not the case.

The deghosting algorithms, in accordance with some of the present methods, were tested on the two common-shot gathers shown in FIG. 8. The gathers are single streamer gathers from a dual-coil survey. The first gather 801 comes from an inline shot and the second 802 comes from a cross-line shot. Additionally, the streamers are slanted, with nominal receiver depths varying from 12 meters at the near-end of the streamer to 40 meters at the far end, as shown in FIG. 1, streamer 30s.

Unfortunately, minimizing Equation 13 on the field-data gathers gave poor results: the ghost was poorly attenuated and the deghosted data had a decreased signal-to-noise level. The reasons for this are illustrated in FIG. 9, which shows the estimated sparse τ-p model 910 for a spatial window half way along the streamer and the ghost model 920 for that spatial window at $p_x = -0.35$ s/km.

While the ghost model has roughly the appropriate form at τ=6 s, there are several problems. Firstly, the magnitude of the ghost model is strongly variable. At τ=6 s, its maximum is about 0.3, while at τ=7.5 s its maximum is less than 0.1. This means that where the signal is strong, the deghosting operator removes a lot of energy, and where the signal is weak, it does not. Unfortunately this has the net effect of decreasing signal-to-noise ratio in the reconstructed data. Secondly, the ghost model contains more than just a single ghost event. This means additional features (perhaps the source ghost, or perhaps the signal) will be removed alongside the receiver ghost. Thirdly, because the operator is so strongly variable, it will leave the data in an uncertain state when it has been applied. The data will not be suitable for processes that assume ergodicity like impedance inversion or full waveform inversion (FWI).

To test the ghost delay parameterization algorithm, the objective function in Equation 14 was minimized with respect to ghost-delay times and basis coefficients. The local plane-wave synthesis operator, S, constructed and merged nine spatial windows along each gather, and a separate Δt panel was derived for each spatial window. Rather than attempt a full deghosting operation, the parameter, α, in Equation 8 was set to 0.7 for stability purposes.

Figure 11:
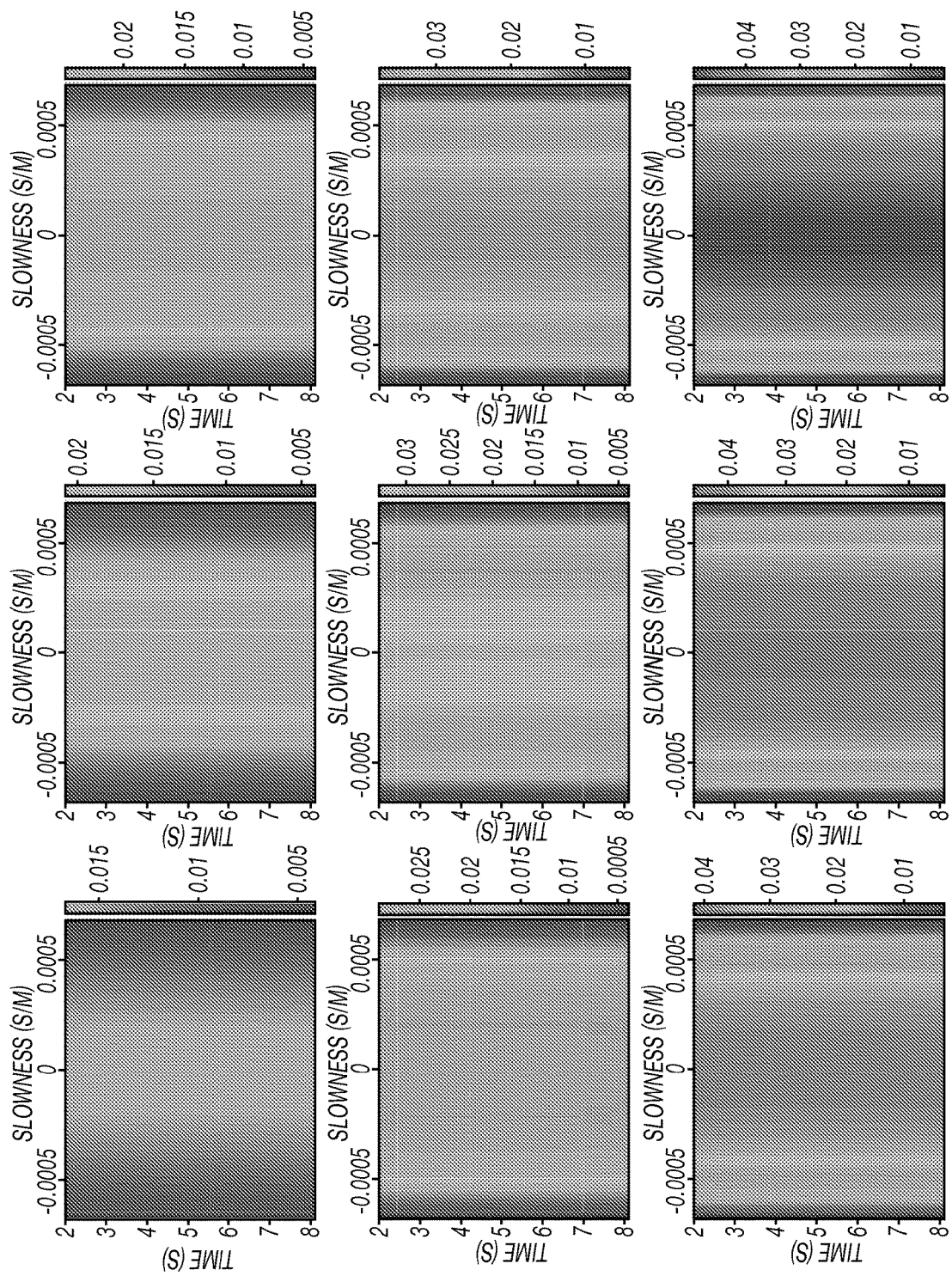
FIG. 11 illustrates an initial $\Delta t$ model for inline gather. The nine panels correspond to the nine spatial windows along the streamer.

FIG. 11 shows the initial Δt panel for the inline gather (FIG. 8a): these values were set to the Δt defined by the equality condition in equation 15, which corresponds to zero crossline propagation—an approximation even in the pseudo-2D case. The ghost delay increases for larger $p_x$, and for the deeper receivers further along the streamer.

To avoid the cycle-skipping problems described above, the inversion was performed in three frequency bands: (i) up to 30 Hz roll-off frequency, (ii) up to 45 Hz roll-off frequency, and (iii) the full bandwidth. This seemed to produce stable results on both gathers.

Figure 10:
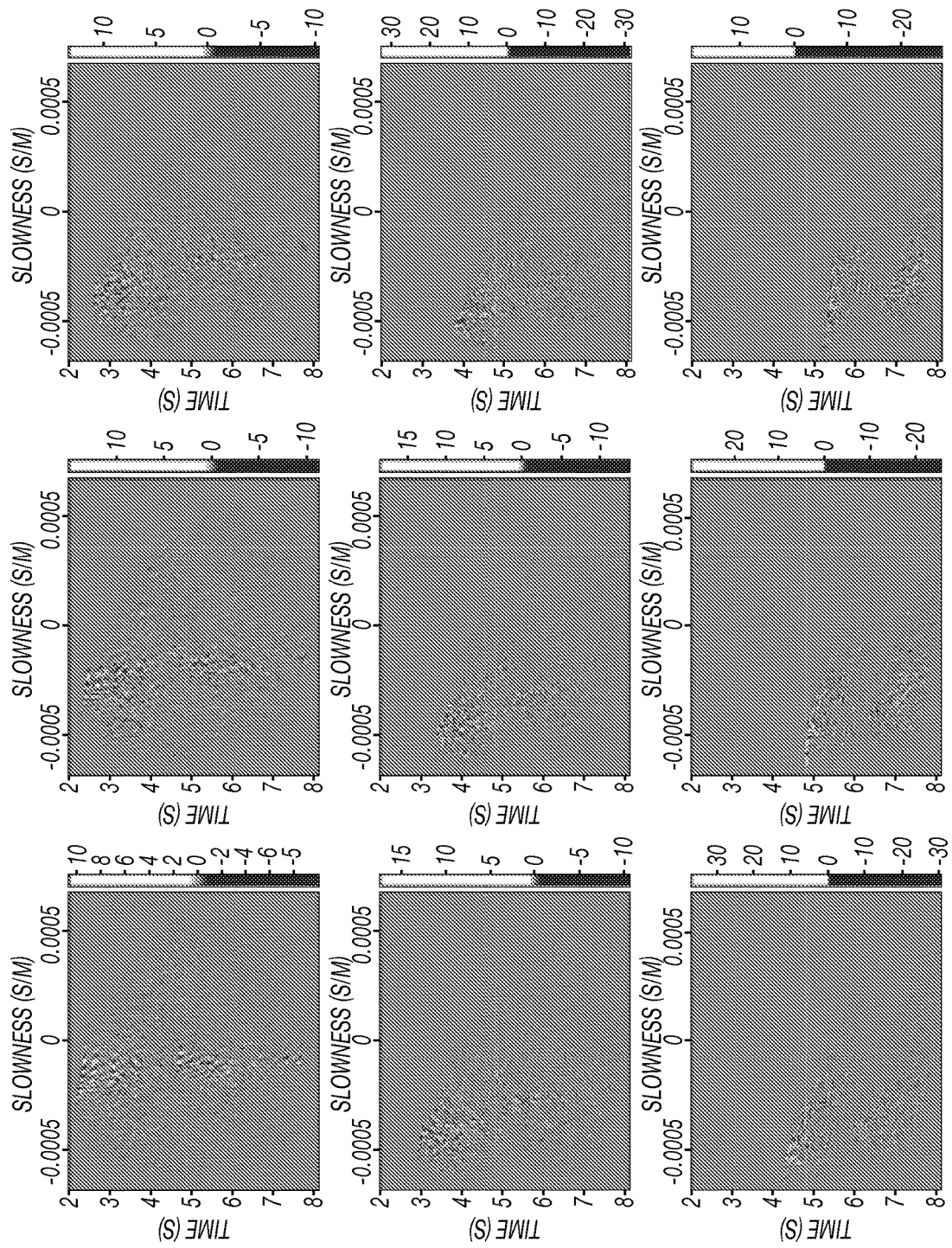
FIG. 10 illustrate sparse basis coefficients corresponding to the nine spatial windows along the inline gather.
Figure 12:
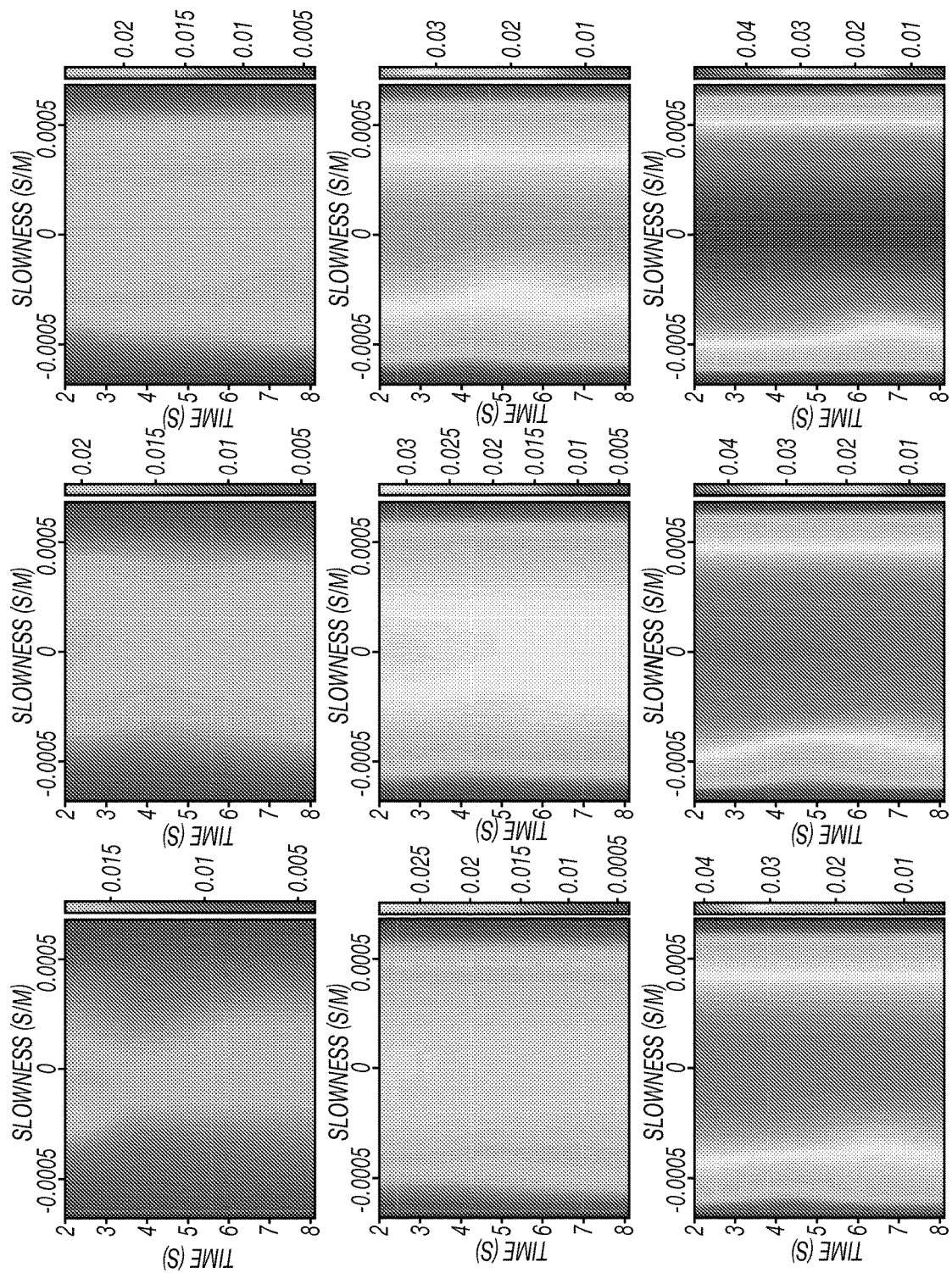
FIG. 12 illustrates an adaptive $\Delta t$ model estimated for the inline gather. The nine panels correspond to the nine spatial windows along the streamer.

The resulting set of nine basis coefficients panels, x, is shown in FIG. 10, and the adaptively estimated Δt panel is shown in FIG. 12. Comparing FIGS. 10, 11 and 12, it is clear that the ghost model has made significant adaptations, particularly where the signal strength is strong. In areas where the signal strength is weak, the ghost model is updated less.

FIG. 13 shows a close up of the results of the inversion resynthesized back in the t-x domain. Partial NMO has been applied to the gathers to improve the display. The top panels 13a and 13b show the resynthesized data (signal plus ghost) in the t-x (left) and f-x (right) domains. Three orders of ghost notch are visible, and at far offsets there is signal visible past the second-order notch.

Figure 13A:
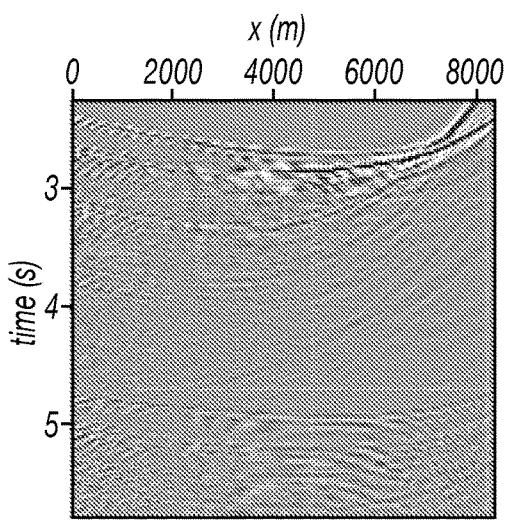
FIGS. 13a-13f illustrate results of an inline test: 13a input data, 13b f-x spectra of the input data, 13c data after non-adaptive deghosting, 13d f-x spectra of 13c, 13e data after adaptive deghosting, and 13f f-x spectra of 13e.
Figure 13B:
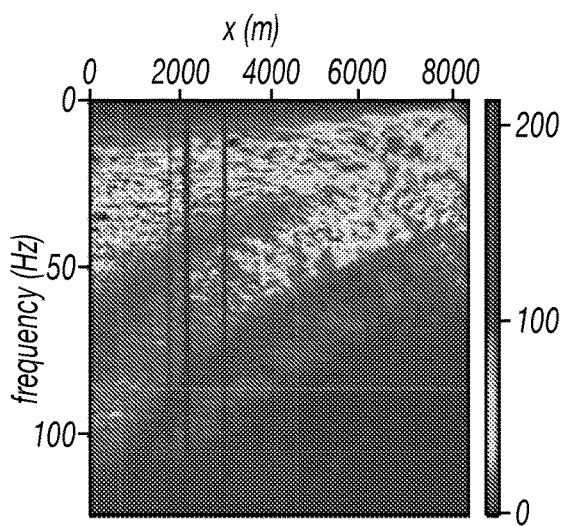
Figure 13C:
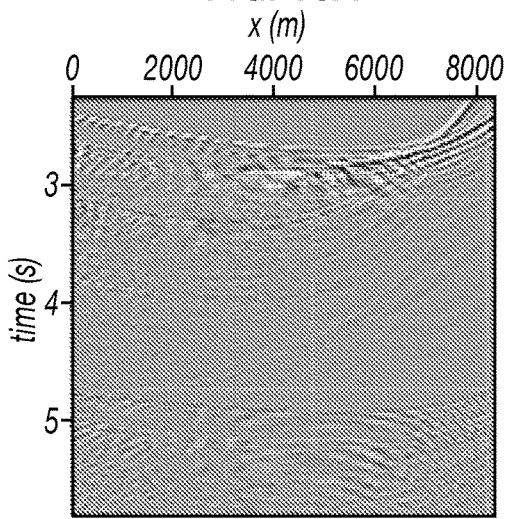
Figure 13D:
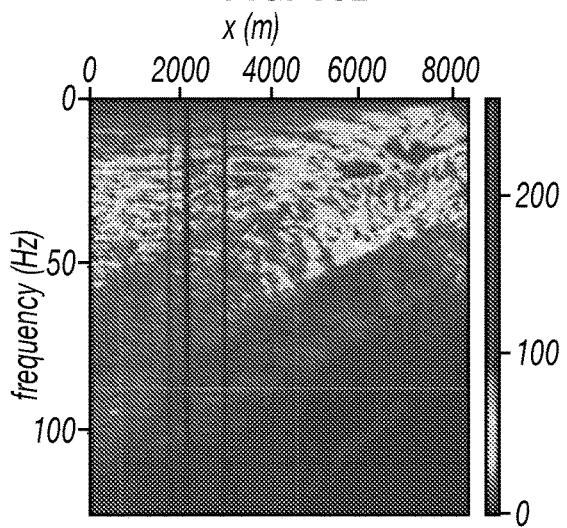

The middle panels, FIGS. 13c and 13d show the results of deghosting with the non-adaptive ghost model shown in FIG. 11. There are problems at the far offsets where the initial ghost model is inaccurate. This manifests itself as ringing in the time domain, and anomalous amplitudes in f-x.

Figure 13E:
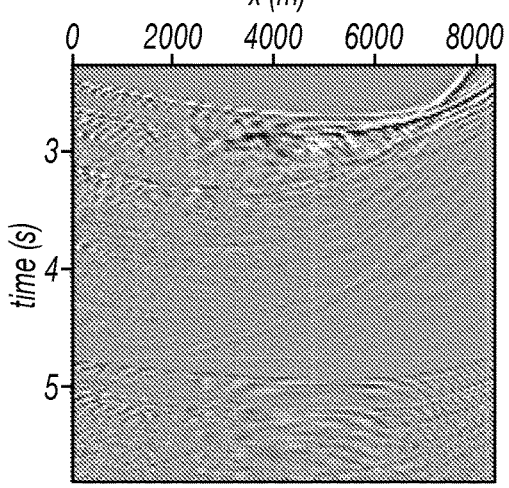
Figure 13F:
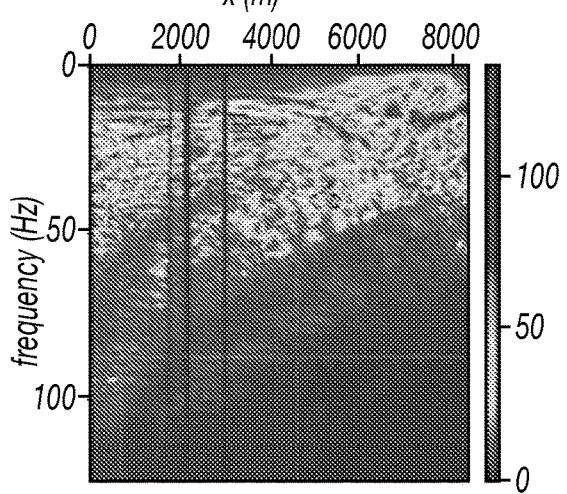

The lower panels, FIGS. 13e and 13f show the results of adaptive deghosting, in accordance with embodiments of the present invention. In the t-x domain, events are sharper with reduced side-lobes, and in the f-x domain, the notches are weaker and the spectra more balanced. There are no significant problems with ringing.

Figure 14:
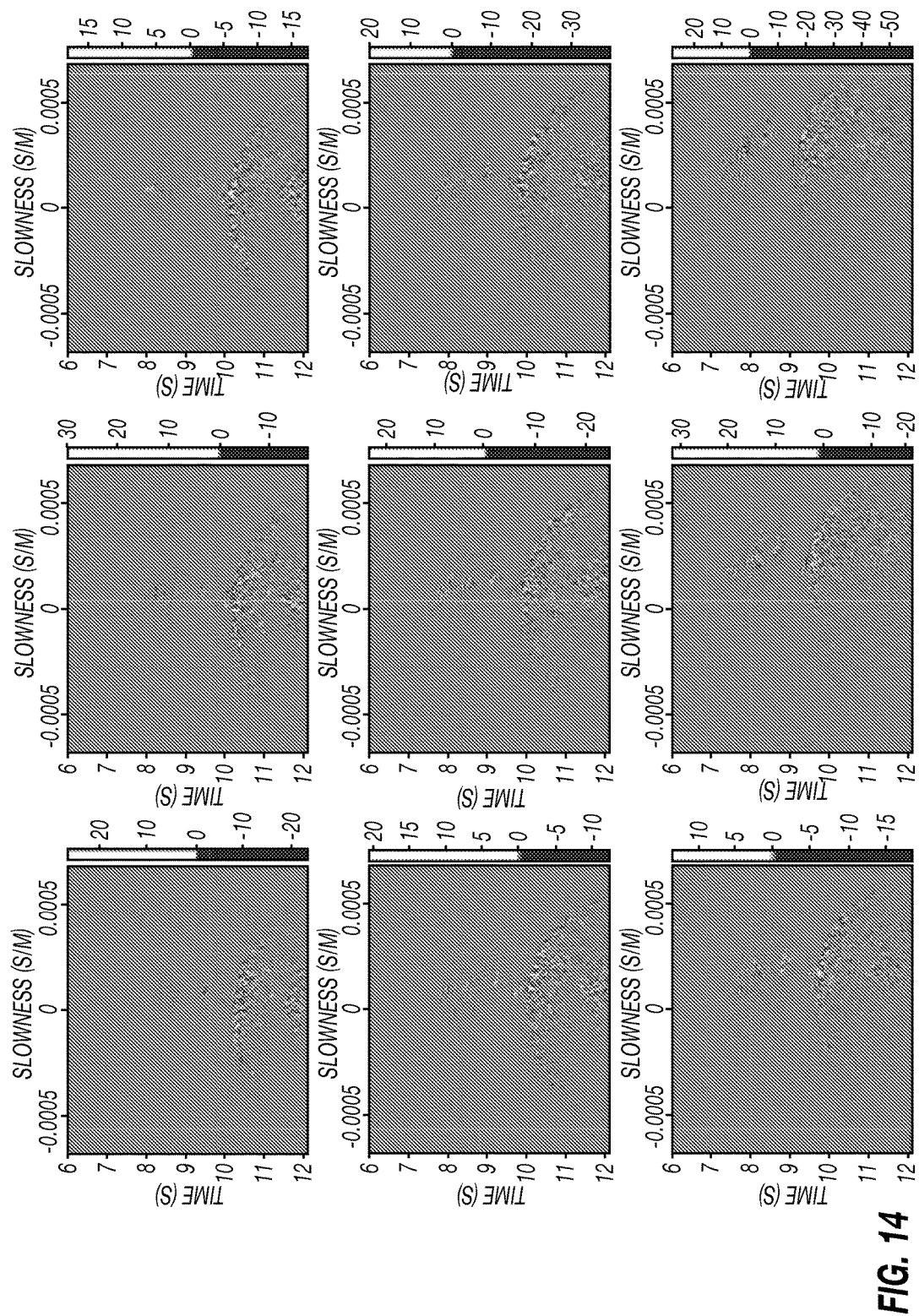
FIG. 14 illustrate sparse basis coefficients corresponding to the nine spatial windows along the cross-line gather.
Figure 15:
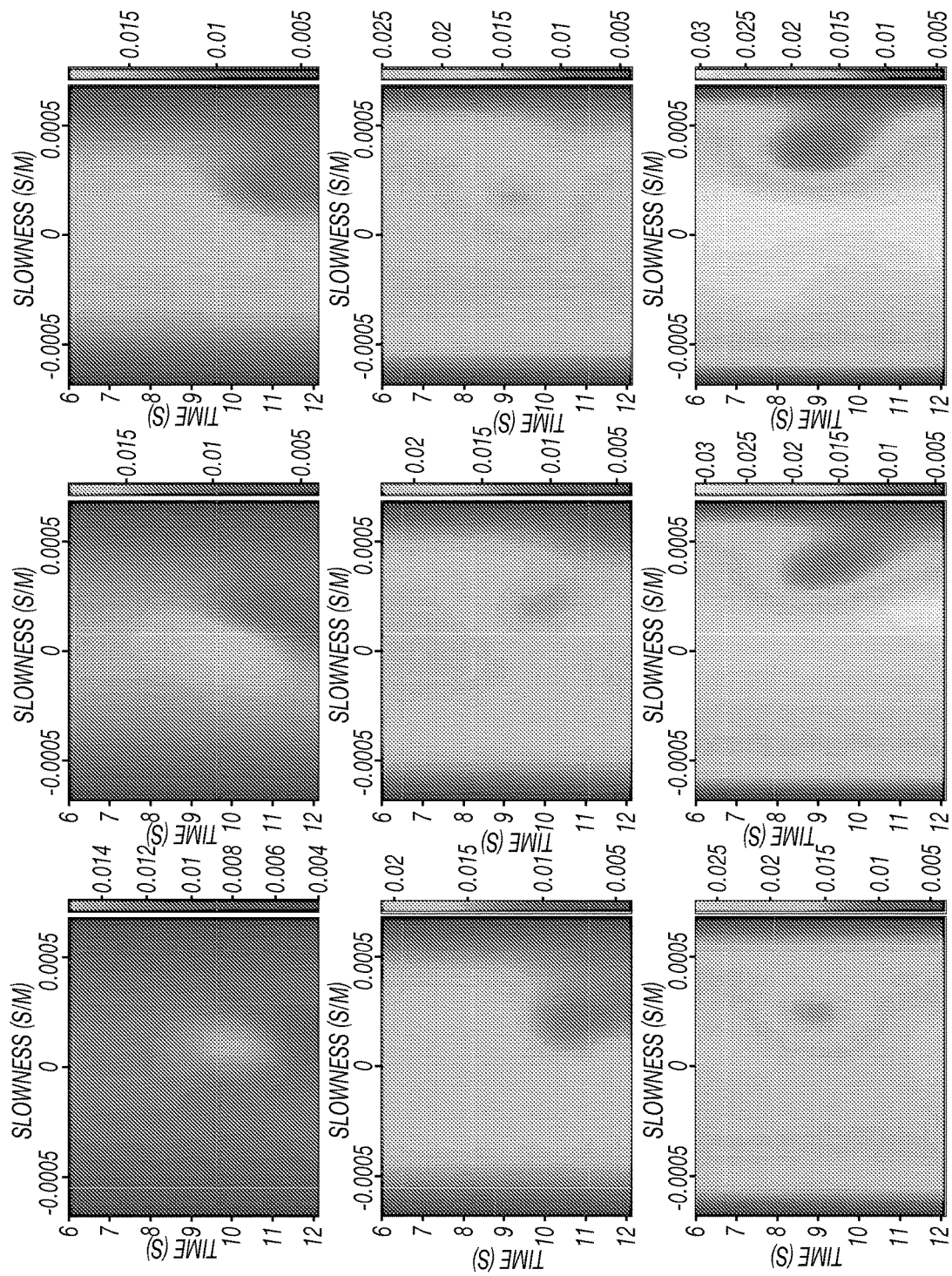
FIG. 15 illustrate an adaptive $\Delta t$ model estimated for the crossline gather. The nine panels correspond to the nine spatial windows along the streamer.
Figure 16A:
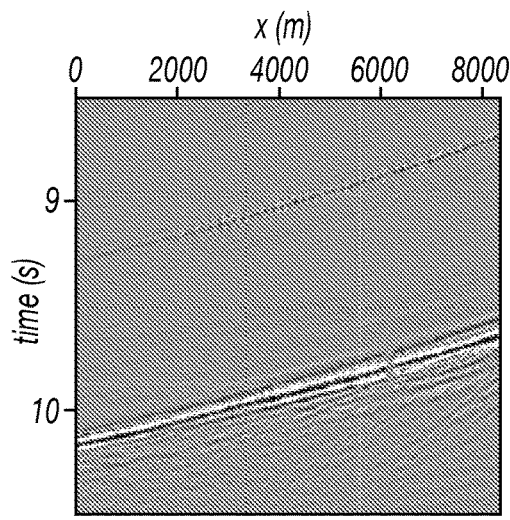
FIGS. 16a-16f illustrate results of a crossline test: 16a input data, 16b f-x spectra of the input data, 16c data after non-adaptive deghosting, 16d f-x spectra of 16c, 16e data after adaptive deghosting, and 16f f-x spectra of 16e.
Figure 16B:
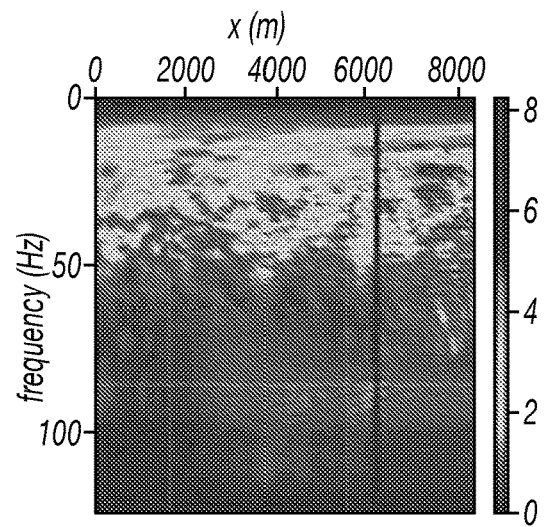
Figure 16C:
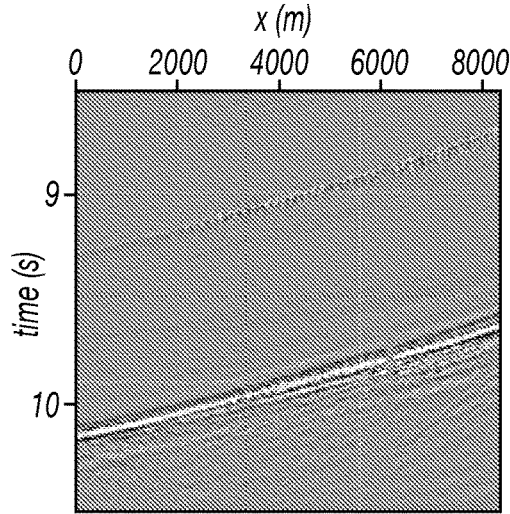
Figure 16D:
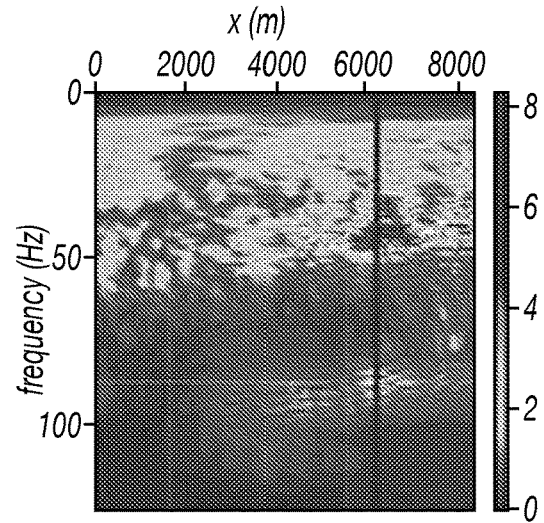
Figure 16E:
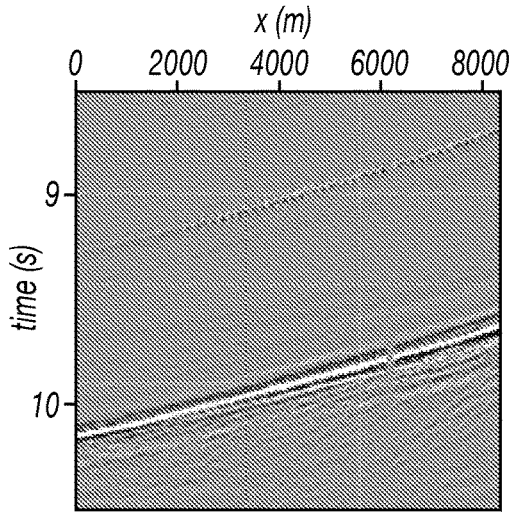
Figure 16F:
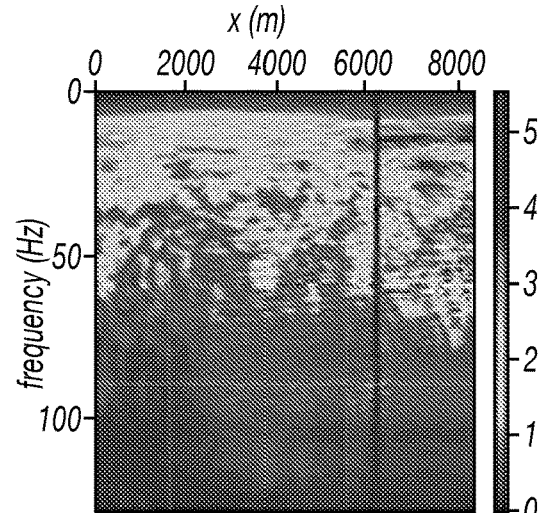

FIGS. 14 and 15 show the estimated basis coefficients and adaptive Δt model for the cross-line gather shown in FIG. 8(b). The initial model for Δt in this case was not $\Delta t_{max}$ from the equality condition in 15. Rather it was, $\Delta t_{max}$, since it was expected that $p_y \neq 0$. Again the algorithm modifies the Δt values significantly where there is a clear signal in the data.

A close-up of the crossline test results is shown in FIG. 16. Again, the top panels 16a and 16b show the signal plus ghost, the middle panels 16c and 16d show the results of deghosting with the non-adaptive model, and the bottom panels 16e and 16f show the results of adaptive deghosting. As with the inline test, the non-adaptive method shows problems with ringing that are mitigated by the adaptive ghost model. The adaptive method, in accordance with embodiments of the present invention, sharpens events in the t-x domain and both broadens and balances the spectra in the f-x domain.

Adaptive deghosting based on an explicit ghost-delay parameterization in accordance with embodiments of the present invention shows promise for mitigating ghost effects in single-streamer marine seismic data. Embodiments of the present invention are shown to suppress the ghosts more effectively than a non-adaptive method. In addition to the deghosting application, in some embodiments, the information contained in the ghost delay times may be used to constrain uncertain streamer depths, or crossline incidence angle.

Figure 17:
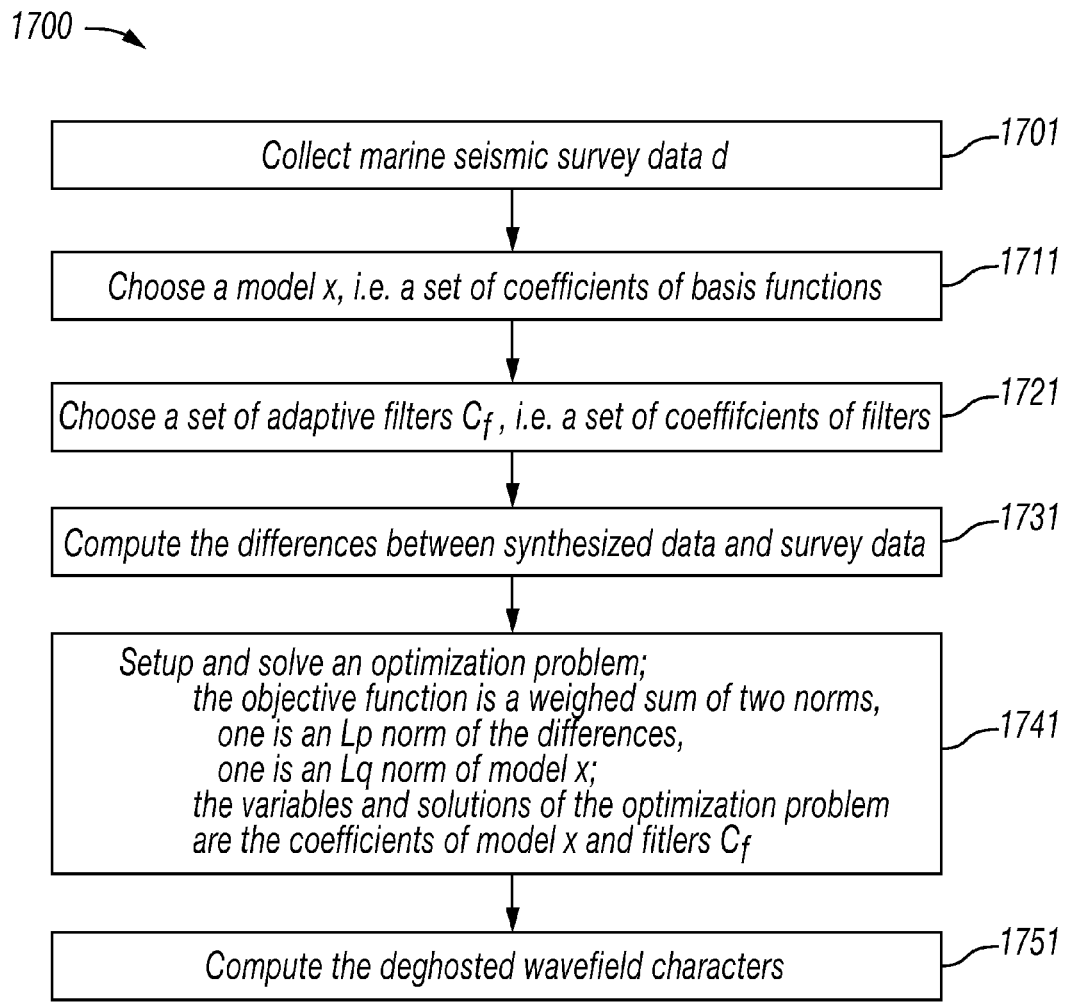
FIG. 17 illustrate a process flow diagram of a method for deghosting using an adaptive operator.

Referring to FIG. 17, a method 1700 for deghosting marine seismic data using adaptive operators according to one embodiment of the present invention is illustrated:

In 1701, collect marine seismic data $d_{tx}$ in time-offset (t-x) domain from a marine seismic survey; the data can be from a single streamer or many streamers;

In 1711, choose a model x, which is a collection of plane wave coefficients in time intercept-slowness (τ-p) domain;

In 1721, choose a set of adaptive filters, which is a collection of filter coefficients in time intercept-slowness (τ-p) domain;

In 1731, compute the differences between synthesized data and the survey data. The synthesized data is derived from the model x and the adaptive filters;

In 1741, set up and solve an optimization (minimization) problem:
  the objective function is the sum of two weighted norms with a weight λ;
  a first norm is an Lp norm of the differences;
  a second norm is an Lq norm of the model x; and
  the variables and solutions are the coefficients of the model x and the adaptive filters.

In 1751, the coefficients of the model x and adaptive filters are used to compute any characters of the deghosted wavefield. For example, one or more wavefields: the upgoing wavefield (deghosted wavefield), the downgoing wavefield (ghost wavefield) and full modeled wavefield.

It is noted that many variations can be made to the above method. In one example, the model x and the adaptive filters are expressed in τ-p domain while the L2 norm is computed in t-x domain. In this case, the synthesized data are transformed from τ-p domain to t-x domain by a synthesis operator S as in Equation 13 or 14.

It is also possible to perform the minimization problem in the τ-p domain, such that the model x and the adaptive filters are used as-is in the τ-p domain but the collected survey data is transformed from t-x domain to τ-p domain. The differences between synthesized data and survey data are taken in τ-p domain as discussed above where the objective functions are shown as in Equations 16 and 17.

The adaptive filters coefficients may be parameterized by adaptive ghost time delay, as in Equations 14 and 17. In those cases, the filter coefficients are no longer independent variables for the optimization problems. A few adaptive ghost time delays replace the filter coefficients as the independent variables. So, the variables (and solutions) for the optimization problem are coefficients of model x and adaptive ghost time delays. The filter coefficients are dependent variables that can be derived from ghost time delays.

It is also possible to skip the FIR filtering, defining the objective function as in Equation 18. The minimization is done with respect to the ghost delay time.

As discussed above, there are many ways to solve the optimization problems that are formulated in method 1700. The particular way or solver used for solving such an optimization problem is not a concern of this application. Once the optimization problem is solved, the model x and the adaptive filters are known, which may be expressed in sets of coefficients. This model and filters can be used in computing any wavefield characterizations, such as mentioned before. They may also be used in subsequent seismic data processing, for example, to generate seismic images of subsurface structures.

The method 1700 can be performed on marine seismic data one streamer at a time or several streamers simultaneously (i.e. 3D data). To avoid cycle-skipping problems, as mentioned above relating to examples shown in FIG. 8 etc., it is beneficial to start the processing from low frequency band. A maximum frequency $f_{max}$ to be processed is selected. The frequency content in the seismic data above the maximum frequency $f_{max}$ is removed. The modified data is used in method 1700. The solution from the modified data is used as an initial model for a next iteration. At each successive iteration, the maximum frequency $f_{max}$ is raised. Finally, the maximum frequency $f_{max}$ is at the upper limit of the seismic data; this means that the full-frequency content is included in the process. The initial model x can be estimated using many methods; for example, it can be estimated using ray-tracing through an Earth in depth.

In the above discussed methods, other parameterizations may be used, such as for example, receiver depth, water velocity, etc. They may be useful and the formulation can be the same.

As mentioned before, the operators may be extended to accurately model the effects of variable depth streamer, such as, for example, the effects of slant streamers. One way to do so is to include a lateral shift in τ-p domain to account for variable depth streamers.

For simplicity, the seismic data discussed above are mostly single component (pressure) data. However, the same method can be used for multi-component data acquired by multi-component streamers, which may include particle motions (three dimensions of velocities or accelerations) and pressures.

As those with skill in the art will understand, one or more of the steps of methods discussed above may be combined and/or the order of some operations may be changed. Further, some operations in methods may be combined with aspects of other example embodiments disclosed herein, and/or the order of some operations may be changed. The process of measurement, its interpretation, and actions taken by operators may be done in an iterative fashion; this concept is applicable to the methods discussed herein. Finally, portions of methods may be performed by any suitable techniques, including on an automated or semi-automated basis on computing system 1800 in FIG. 18.

Figure 18:
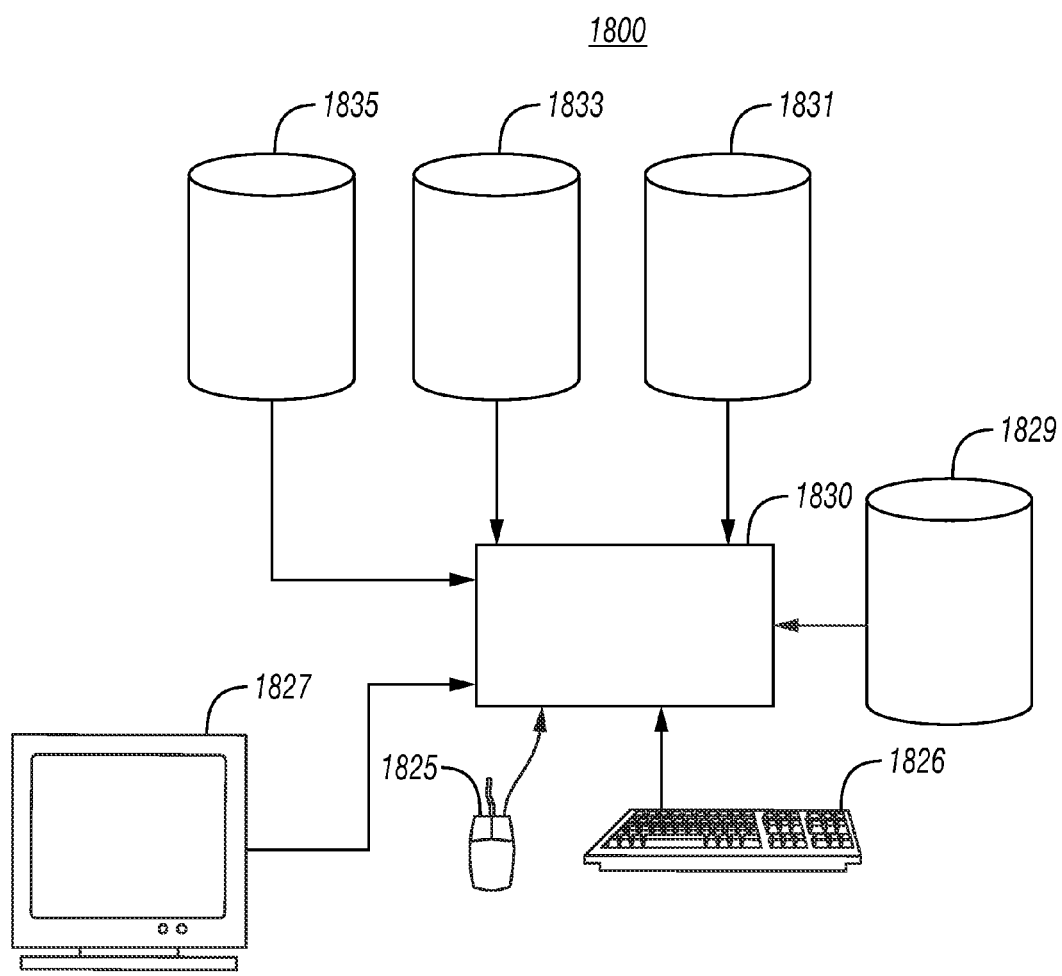
FIG. 18 illustrates a schematic view of a computer system where some of the methods disclosed can be implemented.

Portions of methods described above may be implemented in a computer system 1800, one of which is shown in FIG. 18. The system computer 18300 may be in communication with disk storage devices 1829, 1831, 1833 and 1835, which may be external hard disk storage devices and measurement sensors 13 not shown). It is contemplated that disk storage devices 1829, 1831, 1833 and 1835 are conventional hard disk drives, and as such, may be implemented by way of a local area network or by remote access. While disk storage devices are illustrated as separate devices, a single disk storage device may be used to store any and all of the program instructions, measurement data, and results as desired.

In one implementation, real-time data from the sensors may be stored in disk storage device 1831. Various non-real-time data from different sources may be stored in disk storage device 1833. The system computer 1830 may retrieve the appropriate data from the disk storage devices 1831 or 1833 to process data according to program instructions that correspond to implementations of various techniques described herein. The program instructions may be written in a computer programming language, such as C++, Java or the like. The program instructions may be stored in a computer-readable medium, such as program disk storage device 1835. Such computer-readable media may include computer storage media. Computer storage media may include volatile and non-volatile media, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1830. Combinations of any of the above may also be included within the scope of computer readable media.

In one implementation, the system computer 1830 may present output primarily onto graphics display 1827, or via printer 1828 (not shown). The system computer 1830 may store the results of the methods described above on disk storage 1829, for later use and further analysis. The keyboard 1826 and the pointing device (e.g., a mouse, trackball, or the like) 1825 may be provided with the system computer 1830 to enable interactive operation.

The system computer 1830 may be located on-site, e.g. as part of processing unit 23 on-board a vessel 20 as in FIG. 1 or at a data center remote from the field. The system computer 1830 may be in communication with equipment on site to receive data of various measurements. Such data, after conventional formatting and other initial processing, may be stored by the system computer 1830 as digital data in the disk storage 1831 or 1833 for subsequent retrieval and processing in the manner described above. While FIG. 18 illustrates the disk storage, e.g. 1831 as directly connected to the system computer 1830, it is also contemplated that the disk storage device may be accessible through a local area network or by remote access. Furthermore, while disk storage devices 1829, 1831 are illustrated as separate devices for storing input data and analysis results, the disk storage devices 1829, 1831 may be implemented within a single disk drive (either together with or separately from program disk storage device 1833), or in any other conventional manner as will be fully understood by one of skill in the art having reference to this specification.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A computer implemented method for processing marine seismic data with combined deghosting and sparse i-p transformation, the method comprising:
    (a) having marine seismic data $d_{tx}$ in a time-offset (t-x) domain;
    (b) having a model x comprising a set of coefficients of basis functions;
    (c) having a set of adaptive filters $C_f$ comprising a set of coefficients of filters;
    (d) computing differences between synthesized data and the marine seismic data $d_{tx}$, wherein the synthesized data is derived from the model x and the set of adaptive filters $C_f$;
    (e) setting up and solving an optimization problem, wherein:
        an objective function is a weighted sum of two norms;
        a first norm is an Lp norm of the differences;
        a second norm is an Lq norm of the model x;
        the variables and solutions are coefficients of the model x and coefficients of filters $C_f$; and
        p and q are non-negative numbers;
    (f) using the solutions of the coefficients of model x and the coefficients of filters $C_f$ to derive a deghosted wavefield; and
    (g) processing the deghosted wavefield to generate an image of the Earth subsurface structures.

2. The method of claim 1, wherein the Lp norm is computed in a t-x domain or in a time intercept-slowness domain (τ-p domain).

3. The method of claim 1, wherein the Lq norm is computed in a time intercept-slowness domain (τ-p domain).

4. The method of claim 1, wherein the filter coefficients of filters $C_f$ are parameterized in terms of ghost delay times, and the optimization is done with respect to the ghost delay times.

5. The method of claim 4, wherein:
    the ghost delay time is constrained by an upper ghost delay time limit and
    the ghost delay time varies smoothly as a function of ray parameter (p) and time (τ).

6. The method of claim 4, wherein the parameterization comprises a lateral shift in τ-p domain to account for variable depth streamers.

7. The method of claim 1, wherein the objective function is in the form of Equation 13, 14, 16, 17 or 18 wherein τp refers to time intercept and slowness.

8. The method of claim 1, further comprising:
    selecting a maximum frequency $f_{max}$ less than an upper limit of the seismic data;
    removing frequency content from the marine seismic data above the frequency $f_{max}$;
    processing the data as in claim 1 to derive the model x;
    raising the maximum frequency $f_{max}$; and
    using the model x from the last solution as an initial model x and repeating the above steps, until the $f_{max}$ is at the upper limit of the seismic data.

9. The method of claim 1, wherein the model x is obtained by ray-tracing through an earth in depth.

10. The method of claim 1, further comprising:
    computing a receiver depth from the model x.

11. The method of claim 1, comprising deriving a wavefield characterization wherein the wavefield characterization comprises an upgoing wavefield (deghosted wavefield), a downgoing wavefield (ghost wavefield), or full modeled wavefield.

12. The method of claim 1, wherein p is 0, 1, 1.5 or 2; and q is 0, 1, 1.2 or 2.

13. A data processing system for processing seismic data with adaptive operators, the system comprising:
at least one processor and at least one computer readable storage wherein:
the computer readable storage comprises computer executable instructions, which when executed by the processor, causes the controller to:
(a) access marine seismic data $d_{tx}$ in time-offset (t-x) domain;
(b) access a model x having a set of coefficients of basis functions;
(c) access a set of adaptive filters $C_f$ having a set of coefficients of filters;
(d) compute differences between synthesized data and the data $d_{tx}$, wherein the synthesized data is derived from the model x and adaptive filters $C_f$;
(e) set up and solve an optimization problem, wherein:
an objective function is a weighted sum of two norms;
a first norm is an Lp norm of the differences;
a second norm is an Lq norm of the model x;
the variables and solutions are coefficients of model x and coefficients of filters $C_f$; and
p and q are non-negative numbers;
(f) use the solutions of the coefficients of model x and coefficients of filters $C_f$ to derive a deghosted wavefield; and
(g) process the deghosted wavefield to generate an image of the Earth subsurface structures.

14. The method of claim 1 comprising presenting the image of the Earth subsurface structures as output onto a display.

15. The system of claim 13, wherein the Lp norm is computed in t-x domain or τ-p domain.

16. The system of claim 13, wherein the Lq norm is computed in τ-p domain.

17. The system of claim 13, wherein the filter coefficients of filters $C_f$ are parameterized in terms of ghost delay times, and the optimization is done with respect to the ghost delay times.

18. The system of claim 17, wherein:
the ghost delay time is constrained by an upper ghost delay time limit and
the ghost delay time varies smoothly as a function of ray parameter (p) and time (τ).

19. The system of claim 17, wherein the parameterization comprises a lateral shift in τ-p domain to account for variable depth streamers.

20. The system of claim 13 comprising computer executable instructions, which when executed by the processor, causes the controller to present the image of the Earth subsurface structures as output onto a display.

* * * * *